(12) United States Patent
Ukita

(10) Patent No.: US 6,323,901 B1
(45) Date of Patent: Nov. 27, 2001

(54) SINGLE CCD TYPE COLOR CAMERA HAVING HIGH RESOLUTION AND CAPABLE OF RESTRICTING GENERATION OF GHOST COLOR

(75) Inventor: Shinji Ukita, Kawanishi (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 08/824,296

(22) Filed: Mar. 26, 1997

(30) Foreign Application Priority Data

Mar. 29, 1996 (JP) .................................................. 8-077283
Jul. 31, 1996 (JP) .................................................. 8-201948

(51) Int. Cl.[7] .................................................. H04N 3/14
(52) U.S. Cl. .................................................. 348/273; 348/277
(58) Field of Search .................................................. 348/277, 278, 348/279, 273, 266, 282, 342, 259, 659, 663, 252, 272, 237; 358/512, 515, 518; 382/162, 167

(56) References Cited

U.S. PATENT DOCUMENTS

| | | | |
|---|---|---|---|
| 4,246,601 | * | 1/1981 | Sato et al. .................... 348/277 |
| 4,652,911 | * | 3/1987 | Teranishi et al. .............. 348/279 |
| 4,670,777 | * | 6/1987 | Ishikawa et al. ............... 348/279 |
| 4,697,208 | * | 9/1987 | Eino ........................... 348/266 |
| 4,700,219 | * | 10/1987 | Tanaka et al. ................ 348/223 |
| 4,847,684 | * | 7/1989 | Eino ........................... 348/279 |
| 4,887,252 | | 12/1989 | Miyakawa et al. . |
| 4,939,573 | * | 7/1990 | Teranishi et al. .............. 348/276 |
| 4,945,406 | * | 7/1990 | Cok ............................ 359/506 |
| 4,998,162 | * | 3/1991 | Kondo et al. ................. 348/228 |
| 5,049,983 | * | 9/1991 | Matsumoto et al. .......... 348/273 |
| 5,136,370 | | 8/1992 | Chi . |
| 5,262,849 | * | 11/1993 | Mimura et al. ............... 348/237 |
| 5,307,159 | * | 4/1994 | Hieda .......................... 348/273 |
| 5,457,494 | * | 10/1995 | Suga et al. ................... 348/272 |
| 5,506,618 | * | 4/1996 | Yoneyama et al. ........... 348/279 |
| 5,534,919 | * | 7/1996 | Nobuoka ...................... 348/246 |
| 5,552,827 | * | 9/1996 | Maenaka et al. ............. 348/266 |
| 5,745,171 | * | 4/1998 | Ogawa et al. ................ 348/273 |
| 5,852,468 | * | 12/1998 | Okada ........................ 348/272 |
| 6,031,569 | * | 2/2000 | Nobuoka et al. ............. 348/220 |

FOREIGN PATENT DOCUMENTS

| | | | |
|---|---|---|---|
| 0 570 204 | | 11/1993 | (EP) . |
| 0624041 | * | 9/1994 | (EP) ................. H04N/9/04 |

* cited by examiner

Primary Examiner—Reinhard J. Eisenzopf
Assistant Examiner—Aung S. Moe
(74) Attorney, Agent, or Firm—Michaelson & Wallace; Peter L. Michaelson

(57) ABSTRACT

A CCD 10, a solid state imaging device is driven by a driving circuit 102 to perform an independent reading driving to all the pixels. A CLCRCB generation circuit 104 receives a signal output from CCD 10 to make RAM 106 store the signal, generates a luminance signal CL and color differential signals CR and CB for a pixel (x, y) in the y-th row and the x-th column in CCD 10 by an operation based on the output signal from the two rows and two columns stored in RAM 106. Matrix circuit 108 receives signals CL, CR and CB and separates and generates an RGB signal to each of all the pixels in CCD 10 by a prescribed linear operation.

5 Claims, 18 Drawing Sheets

|   | 0 | 1 | 2 | 3 | |
|---|---|---|---|---|---|
| 0 | Ye | Cy | Ye | Cy | 0TH LINE |
| 1 | Mg | G | Mg | G | 1ST LINE |
| 2 | Ye | Cy | Ye | Cy | 2ND LINE |
| 3 | G | Mg | G | Mg | 3RD LINE |
| 4 | Ye | Cy | Ye | Cy | 4TH LINE |

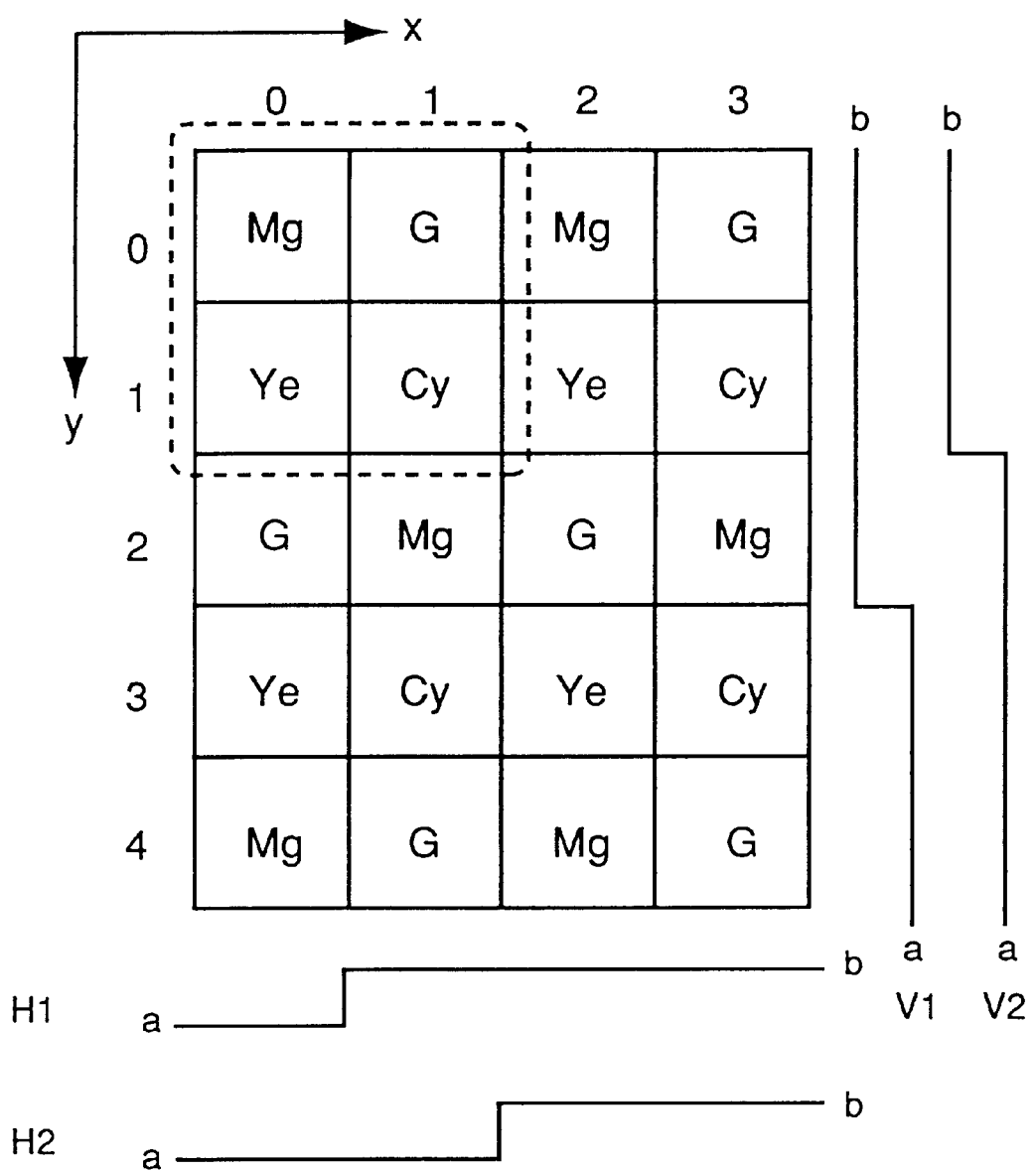

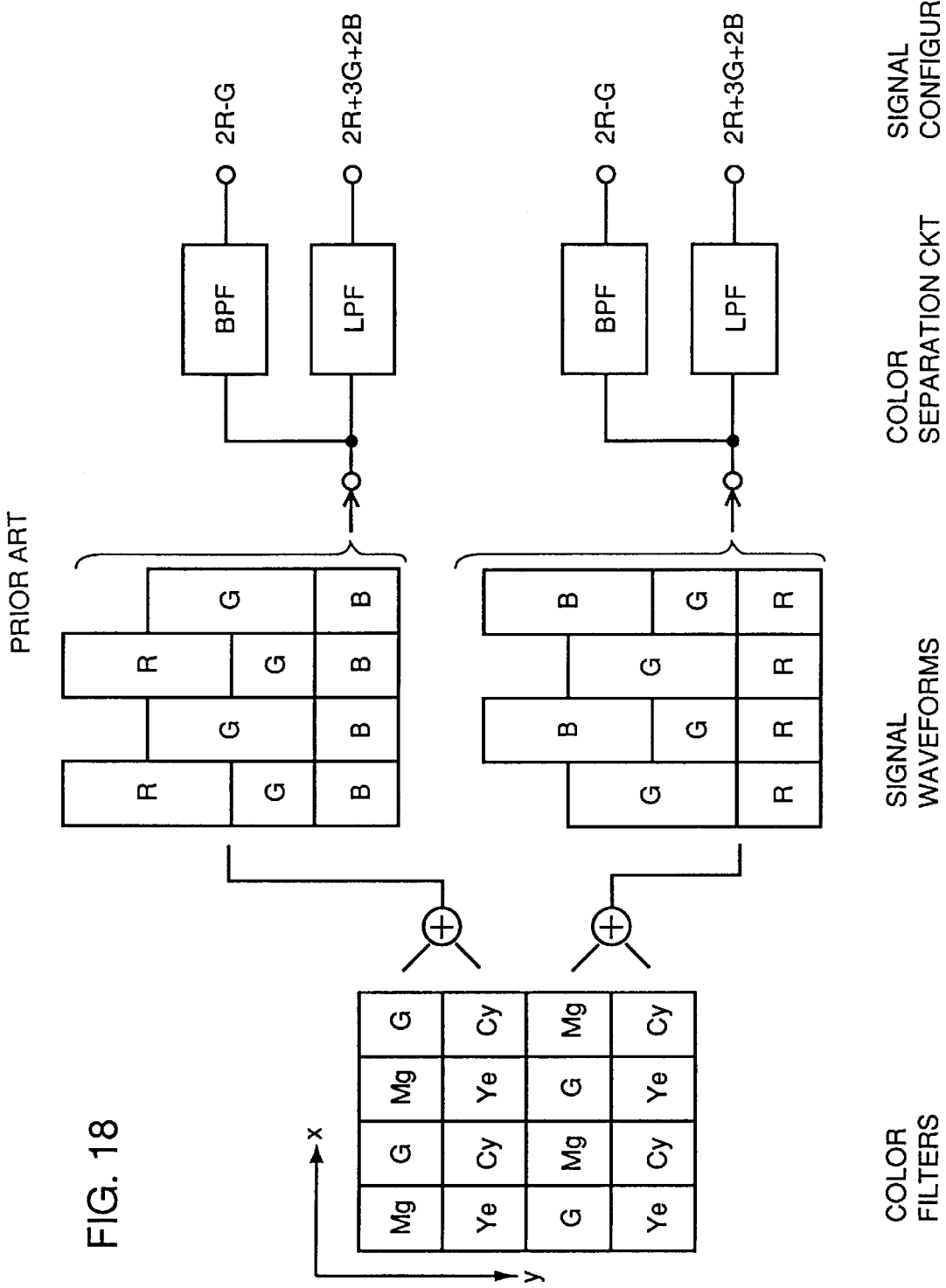

EXAMPLE OF LPF

SPECTRUM OF Y

SINGLE CCD TYPE COLOR CAMERA HAVING HIGH RESOLUTION AND CAPABLE OF RESTRICTING GENERATION OF GHOST COLOR

BACKGROUND OF THE INVENTION

1. Field of the Invention

The present invention relates generally to color cameras, and more particularly to a single CCD type color camera having a color separation circuit for processing a signal from a solid state imaging device which includes photoelectric conversion elements arranged in an array corresponding to color filters arranged in a color differentially ordered array, and a method of separating color signals using such a circuit.

2. Description of the Background Art

A CCD (Charge Coupled Device) which is widely used today as an imaging device in a color camera simply changes the amplitude of a signal to output in response to the brightness of light which it receives, and the output signal does not include any color information. Therefore, in order to obtain color information, some optical means must be employed for example for filtering light incident to the CCD.

For home use, a so-called single CCD type color camera which extracts three primary color signals from a single CCD is employed, and a color filter array is used on the side of the light receiving surface of the CCD according to a so-called simultaneous color imaging method.

Structure of Inter-line Transfer CCD

FIG. 16 is a block diagram schematically showing the structure of an inter-line transfer CCD 10 generally used in a color camera for home use.

Inter-line transfer CCD 10 includes a photosensitive portion 12 formed of p-n junction type photodiodes arranged in an array, a transfer portion 14 including an analog shift register formed of a CCD, and a horizontal transfer register 16 for transferring signals formed by converting signal charges sequentially transferred from transfer portion 14 into voltage in the horizontal direction for output.

FIG. 16 includes p-n junction type photodiodes corresponding to three pixels arranged each in the vertical and horizontal direction for ease of illustration. In an actual CCD for use in a color camera, photodiodes corresponding to 500 pixels in the vertical direction and 500 to 800 pixels in the horizontal direction for example are arranged in an array.

The operation will be briefly described.

When light comes into the photodiodes, charges are generated and accumulated within the diodes. Then, application of a prescribed voltage to a shift gate causes the accumulated charges to be simultaneously transferred to the analog shift register. The CCD analog shift register sequentially transfers charges toward horizontal transfer register 16 in response to applied clock pulse voltages $\phi V1$, $\phi V2$, and $\phi V3$. Horizontal transfer register 16 converts thus transferred received signal charges into voltages, and is then driven by externally applied horizontal driving signals $\phi H1$, $\phi H2$, and $\phi H3$ to externally sequentially output the voltages as imaging signal outputs.

Driving Method of Inter-line Transfer CCD

The inter-line transfer CCD is generally driven in two modes, i.e., frame accumulation and field accumulation. The field accumulation mode used corresponding to a color differentially ordered color filter array will be detailed.

FIGS. 17A and 17B are schematic diagrams for use in illustration of how signal charges are read out form inter-line transfer CCD 10 according to the field accumulation mode, FIG. 17A shows a method of reading out a signal charge in an odd-numbered field, and FIG. 17B a method of reading out a signal charge in an even-numbered field.

As shown in FIG. 17A, in an odd-numbered field, signals from an odd-numbered pixel and an even-numbered pixel in the vertical direction are simultaneously transferred from the photosensitive portion to the transfer portion, where the signals are added.

In an even-numbered field as shown in FIG. 17B, signals from an even-numbered pixel and an odd-numbered pixel in a different combination from the above are simultaneously transferred to transfer portion 14, where they are added.

If the color filter array is color differentially ordered, color differential signals are separated using such a method of transferring in inter-line transfer CCD 10.

Method of Separating Color Differential Signals

FIG. 18 is a diagram schematically showing the flow of processing a signal output from inter-line transfer CCD 10 when the color filter array is color differentially ordered.

As shown in FIG. 18, in the color differentially ordered color filter array, color filters of magenta (hereinafter Mg), green (hereinafter G), cyan (hereinafter Cy), and yellow (hereinafter Ye) are arranged in a mosaic.

Now, since so-called additive color process is possible in mixing colors in light, between three primary colors red (R), green (G) and blue (B) and the complementary colors Mg, Ye and Cy, the following relation is established:

$$Mg = R + B \quad (1)$$

$$Ye = R + G \quad (2)$$

$$Cy = B + G \quad (3)$$

Therefore, using Mg, G, Ye and Cy described above as the colors of color filters permits the intensity of a G signal weighing the most in a luminance signal among three primary colors R, G and B to be higher than that of a B signal.

In the example shown in FIG. 18, an array portion of four rows and four columns is extracted from the color differentially ordered color filter array for illustration. In odd-numbered rows (y-direction), color filters of Mg and color filters of G are alternately arranged in the horizontal direction (x-direction).

In even-numbered rows, color filters of Ye and color filters of Cy are alternately arranged in the horizontal direction. The method of reading out from inter-line transfer CCD 10 having the color filter array arrangement is on the basis of 2-pixel addition reading in the vertical direction (y-direction).

In an odd-numbered field, an odd-numbered pixel and an even-numbered pixel in the vertical direction are added, and in the following even-numbered field, a different combination of an even-numbered pixel and an odd-numbered pixel are added. Thus, in the even-numbered field for example signals are output in the order of G+Cy, Mg+Ye, . . . in the n-th scanning line and in the order of Mg+Cy, G+Ye, . . . in the n+1-th scanning line.

These signals are pulse amplitude modulated signals as shown in FIG. 18. In FIG. 18, based on the above expressions (1) to (3), the complementary color signals are replaced by three primary color signals and indicated as the amplitude modulated waveforms of the three primary color signals.

A direct current component and a fundamental wave component excluding a harmonic component are shown as follows.

Signal So in the n-th scanning line in the even-numbered field is as follows:

$$So=(Mg+Ye)+(G+Cy)+\tfrac{1}{2}\cdot\{(Mg+Ye)-(G+Cy)\}\sin(2\pi fnt)=2R+3G+2B+\tfrac{1}{2}\cdot(2R-G)\sin(2\pi fnt) \quad (4)$$

Signal Se in the n+1-th scanning line is as follows:

$$Se=(Mg+Cy)+(G+Ye)+\tfrac{1}{2}\cdot\{(Mg+Cy)-G+Ye)\}\sin(2\pi fnt)=2R+3G+2B+\tfrac{1}{2}\cdot(2B-G)\sin(2\pi fnt) \quad (5)$$

where fn indicates a Nyquist frequency, i.e. a sampling frequency.

A luminance signal is obtained by filtering only the direct current component in the above expressions (4) and (5) through a low-pass filter (hereinafter LPF).

The luminance signal and two color differential signals 2R–G and 2B–G can be readily separated if passed through a band-pass filter (hereinafter BPF) having a center frequency fn and detected.

More specifically, the luminance signal and color differential signals can be line-sequentially obtained.

However, in view of a single scanning line, only the color differential signals obtained are 2R–G and 2B–G, and the color signals corresponding to the scanning line cannot be reproduced.

The luminance signal and color signals are actually reproduced as follows:

A luminance signal CL is produced by the sum of adjacent pixels in each row in an output signal from the CCD:

$$CL=Ye+Cy+Mg+G=2R+3G+2B$$

The LPF with this end is implemented for example by a circuit shown in FIG. 19.

An LPF 20 includes a one-pixel delay circuit 22 receiving an output signal from the CCD, an adder circuit 24 for adding the output signal received from the CCD and the signal received from one-pixel delay circuit 22 for output, and an attenuator 26 for reducing the intensity of a signal by half.

The transfer function LPF(z) and frequency characteristic of the LPF are as follows:

$$LPF(Z)=(1+Z^{-1})/2 \quad (6)$$

$$|LPF(Z)|=|\cos(\pi f/2fn)| \quad (7)$$

The intensity of a Y signal is therefore gradually reduced from the low frequency region and reaches 0 at Nyquist frequency fn as shown in FIG. 20.

If CCD 10 has H effective pixels in the horizontal direction and V effective pixels in the vertical direction, the horizontal resolution for a luminance signal within a single field will be H and the vertical resolution will be V/2. More specifically, the resolution in the vertical direction is half the number of pixels arranged in the CCD.

Now, a separation processing for color signals will be described.

FIG. 21 is a block diagram schematically showing the structure of a conventional color separation circuit 500 which separates three primary color signals R, G, and B from a CCD output signal.

Color separation circuit 500 includes a sample-hold circuit 502 performing a sample and hold (S&H) operative on received CCD output signal in response to a sampling pulse SP1 and outputting a signal S1 (Ye+Mg, . . . in the n-th line), a sample-hold circuit 504 for performing a sampling and holding to a received CCD output signal in response a sampling pulse SP2 in a phase 180 different from that of sampling pulse SP1 and outputting a signal S2 (Cy+G, . . . in the n-th line), an adder circuit 506 for adding received signals S1 and S2 and outputting an added signal S1+S2, and a subtracter circuit 508 for outputting a differential signal S1–S2 between received signals S1 and S2.

Color separation circuit 500 further includes a 1H delay line 510 for delaying received signal S1–S2 by one horizontal scanning interval for output, a selecting circuit 512 for selectively outputting one of signal S1–S2 and an output from 1H delay line 510 in response to a line selecting pulse, thereby outputting color differential signal CR (=2R–G) and color differential signal CB (=2B–G) for each line, and a matrix circuit 514 for performing a prescribed linear operation to the output from selecting circuit 512 and signal S1+S2, in other words luminance signal CL which it receives and outputting separated three primary color signals R, G and B.

FIG. 22 is a diagram schematically showing the relation between signals output from CCD 10 and sample-hold pulses SP1 and SP2 for sampling and holding the signals.

Referring to FIGS. 21 and 22, the operation of the conventional color separation circuit 500 shown in FIG. 21 will be described.

Although a signal processing in an even-numbered field will be described, the basic operation is entirely the same for an odd-numbered field except that rows subjected to a signal addition are shifted.

Assuming that CCD outputs from n-th line in the even-numbered field have been sampled and held in response to sample-hold pulses SP1 and SP2, signals S1 and S2 output from sample-hold circuits 502 and 504 will be considered.

Referring to FIG. 22, signal S1 sampled and held in response to sampling pulse SP1 is a sum signal of signal Ye and signal Mg for the n-th line. Signal S2 sampled and held in response to sampling pulse SP2 is a sum signal of signal Cy and signal G.

The sum and difference between signals S1 and S2 are as follows:

$$S1+S2=Ye+Mg+Cy+G=2R+3G+2B \quad (8)$$

$$S1-S2=(Ye+Mg)-(Cy+G)=2R-G \quad (9)$$

Signal S1 produced by sampling and holding the output signal from the n+1st line in the CCD in the even-numbered field in response to sampling pulse SP1 is a sum signal of signal Ye and signal G, and signal sampled and held in response to sampling pulse SP2 is a sum signal of signal Cy and signal Mg.

A differential difference signal between signals S1 and S2 is therefore represented as follows:

$$S1-S2=(G+Ye)-(Mg+Cy)=-(2B-G) \quad (10)$$

then for 2R–G=CR, –(2B–G)=CB, and 2R+3G+2B=CL, signal CR and signal CB can be alternately obtained for each line by producing differential signal S1–S2.

In order to produce a color signal for each single scanning line, luminance signal CL, color differential signals CR and CB are necessary for the scanning line.

In color separation circuit 500, to a particular scanning line such as the n+1st line, color signals are produced/separated in the n+1st line by using color differential signal CB obtained from the n+1st line and color differential signal CR obtained from the n-th line.

More specifically, signal S1–S2 (CR, CB, . . . ) output from subtracter circuit 508 and a signal (CB, CR, . . . ) obtained by passing the signal through 1H delay line 510 are input to selecting circuit 512 switched in response to a line selecting pulse, so that color differential signal S1–S2 one scanning line before may be used as a color differential signal for the scanning line which is currently being read.

More specifically, selecting circuit 512 directly outputs signal S1–S2 corresponding to the presently read scanning line to matrix circuit 514 as color differential signal CR if the signal is signal CR, and at the same time outputs a color differential signal one scanning line before which is output from 1H delay line 510 as signal CB to matrix circuit 514.

Conversely, signal from 1H delay line 510 is output as color differential signal CR and signal S1–S2 from subtracter circuit 508 is output as color differential signal CB to matrix circuit 514 if color differential signal S1–S2 read out from the present scanning line corresponds to signal CB.

Matrix circuit 514 outputs three primary color signals R, G and B according to the following transforms from three received signals, luminance signal CL and color differential signals CR and CB.

$$G=(2CL-2CR-2CB)/10 \quad (11)$$

$$R=(CL+4CR-CB)/10 \quad (12)$$

$$B=(CL-CR+4CB)/10 \quad (13)$$

Signals S1 and S2 result from sampling and holding the output signal of the CCD in response to sampling frequency fn. FIG. 23 shows the frequency characteristic of signals S1 and S2.

Signals S1 and S2 result from sampling and holding, the response of which gradually decreases from the low frequency region and reaches 0 at frequency fn/2.

Luminance signal CL, color differential signals CR and CB and RGB signal resulting from these signals have similar frequency characteristic as FIG. 23.

The horizontal resolution of the RGB signal is therefore H/2. The vertical resolution within a single field is V/4 for signals CR and CB, and V/2 for luminance signal CL. For the RGB signal resulting from these signals, the vertical resolution is about V/4.

As described above, the resolution corresponding to only ½ to ¼ the number of effective pixels can be obtained for RGB.

SUMMARY OF THE INVENTION

It is an object of the invention to provide a single CCD type color camera capable of reproducing a luminance signal and color differential (difference) signals at a high resolution relative to the number of effective pixels.

Another object of the invention is to provide a method of color separation permitting a luminance signal and color differential signals corresponding to each pixel to be produced based on output signals independently read out from all the pixels of a CCD.

Yet another object of the invention is to provide a single CCD type color camera capable of restricting a ghost color signal at edges of an image and improving picture quality.

In summary, the present invention is directed to a single CCD color camera including a solid state imaging device and a color separation circuit. The solid state imaging device has photoelectric conversion elements corresponding to pixels and arranged in an array. The solid state imaging device includes a color filter array in which color differentially ordered color filters corresponding to the photoelectric conversion elements are arranged on the side of its light receiving surface, and green and three kinds of complementary color filters are provided corresponding to four pixels in an arbitrary set of two rows and two columns. The color separation circuit produces a color signal corresponding to the central position of the set of four pixels on the basis of output signals from pixels in two rows and two columns among four rows and two columns including the four pixels in response to output signals independently read out from all the pixels by the solid state imaging device. The color separation circuit includes a storing circuit for storing signals sequentially output from the solid state imaging device, and an operation circuit for producing a luminance signal and color differential signals corresponding to the differences in intensity between a green signal and the other two primary color signals for each set of four pixels and producing a color signal from the luminance signal and the color differential signals.

In a preferred embodiment, the operation circuit produces a color signal corresponding to the central position by a linear operation to output signals from a set of pixels in two rows and two columns including a pixel in the y-th row and the x-th column (x, y) stored in the storing circuit.

In another preferred embodiment, the operation circuit:
i) produces a color differential signal by output signals from a set of pixels in two rows and two columns if photoelectric conversion elements to output a signal including a prescribed primary color signal among photoelectric conversion elements corresponding to complementary color filters in the pixels in the two rows and two columns are diagonally arranged,
ii) produces a color differential signal by output signals from a set of adjacent pixels in two rows and two columns to share two pixels among the pixels in two rows and two columns if photoelectric conversion elements to output a signal including a prescribed primary color signal among photoelectric conversion elements corresponding to complementary color filters in the pixels in two rows and two columns are not diagonally arranged.

In another aspect of the invention, a method of separating a color signal in a single CCD type color camera including a solid state imaging device having a color differentially ordered color filter array and a corresponding photoelectric conversion element array includes the steps of:
producing a luminance signal CL(x, y) corresponding to pixels (x, y) by a prescribed linear operation of output signals from a set of pixels in two rows and two columns including pixel (x, y), on the basis of an output signal from the solid state imaging device corresponding to pixels in the y-th row and the x-th column (x, y); producing a first color differential signal CR(x, y) corresponding to pixel (x, y) by a first linear operation depending on the arrangement of color filter array corresponding to the set of pixels to the output signals from the set of pixels; and producing a second color differential signal CB(x, y) corresponding to pixel (x, y) by a second linear operation depending on the arrangement of color filter array corresponding to the set of pixels to the output signals from the set of pixels.

In yet another aspect of the invention, a method of separating a color signal in a single CCD color camera including a color filter array having color differentially ordered filters in which green and three kinds of complementary colors correspond to four pixels in an arbitrary set of two rows and two columns and a solid state imaging device having photoelectric conversion elements corresponding to the pixels arranged in an array including the steps of:
i) producing a luminance signal for each set of four pixels from the sum of signals output from the set of pixels based on output signals from the photoelectric conversion elements, and producing color differential signals corresponding to the differences in intensity between a green signal and the other two primary color signals for each set of four pixels by output signals from the set of pixels in the two rows and two columns if photoelectric conversion elements to output a signal including a prescribed primary color signal among the photoelectric conversion elements corresponding to the complementary filters in the pixels in the two rows and the two columns are diagonally arranged, ii) producing the color differential signal by output signals from a set of adjacent pixels in two rows and two columns to share two pixels among the pixels in the two rows and the two columns if photoelectric conversion elements to output a signal including the prescribed primary color signal among the photoelectric conversion elements corresponding to the complementary color filters in the pixels in the two rows and two columns are not diagonally arranged, and producing a color signal from the luminance signal and the color differential signals.

A main advantage of the present invention resides in that if the number of effective pixels in the CCD is H in the horizontal direction and V in the vertical direction, an RGB signal can be produced for each of (H−1)×(V−1) pixels, and therefore a high resolution may be implemented.

Another advantage of the present invention resides in that images free from picture quality deterioration may be reproduced while restricting generation of ghost color signals if the brightness of an object changes and edges whose luminance levels abruptly change exist.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a schematic diagram showing the arrangement of color differentially ordered color filter array and the operation of independently reading from all the pixels;

FIG. 18 is a diagram showing a color separation processing from a conventional color differentially ordered color filter array;

DESCRIPTION OF THE PREFERRED EMBODIMENTS

First Embodiment

Figure 1:
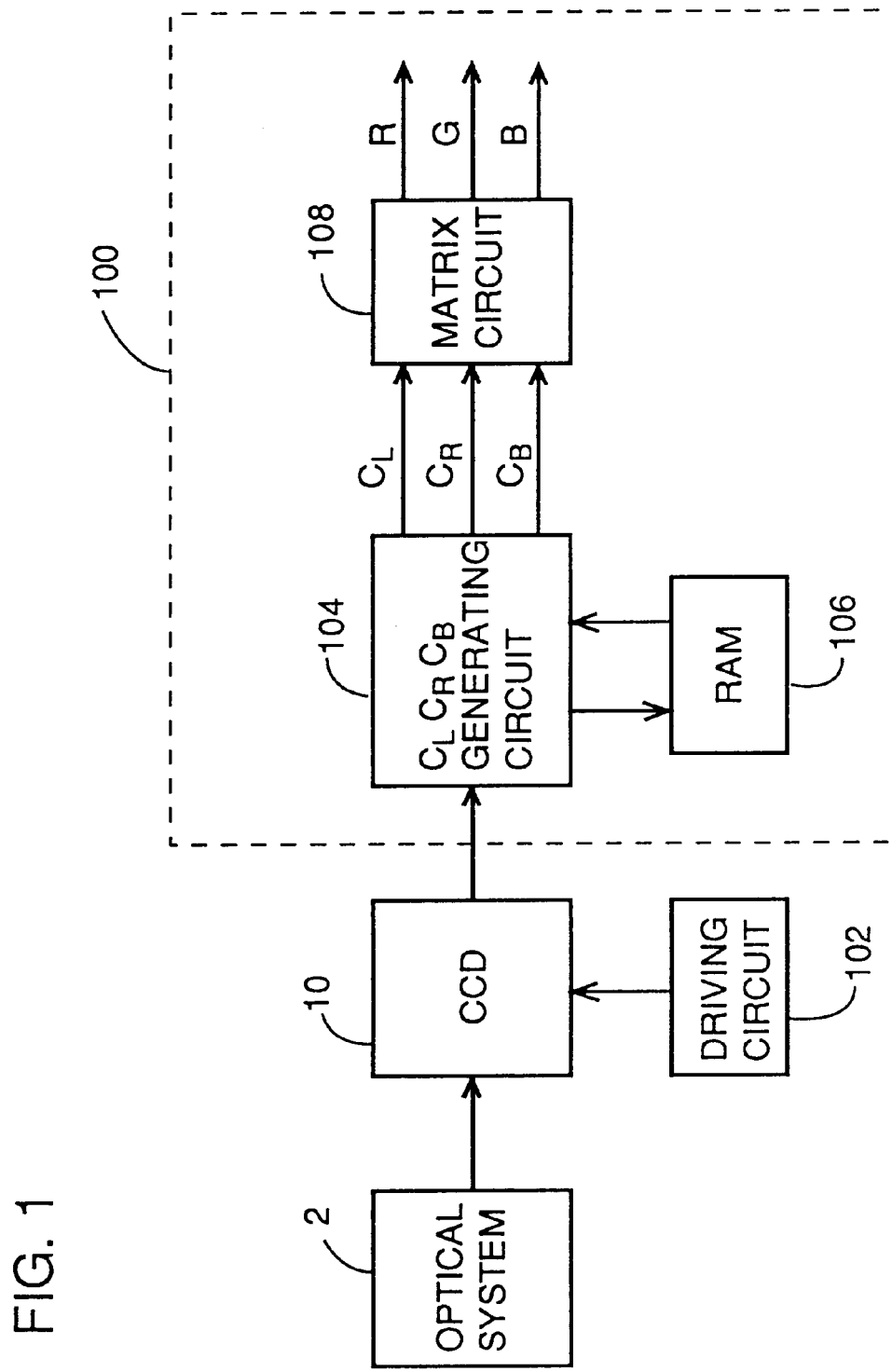
FIG. 1 is a block diagram schematically showing the structure of a color separation circuit 100 in a single CCD color camera according to a first embodiment of the invention.
Figure 21:
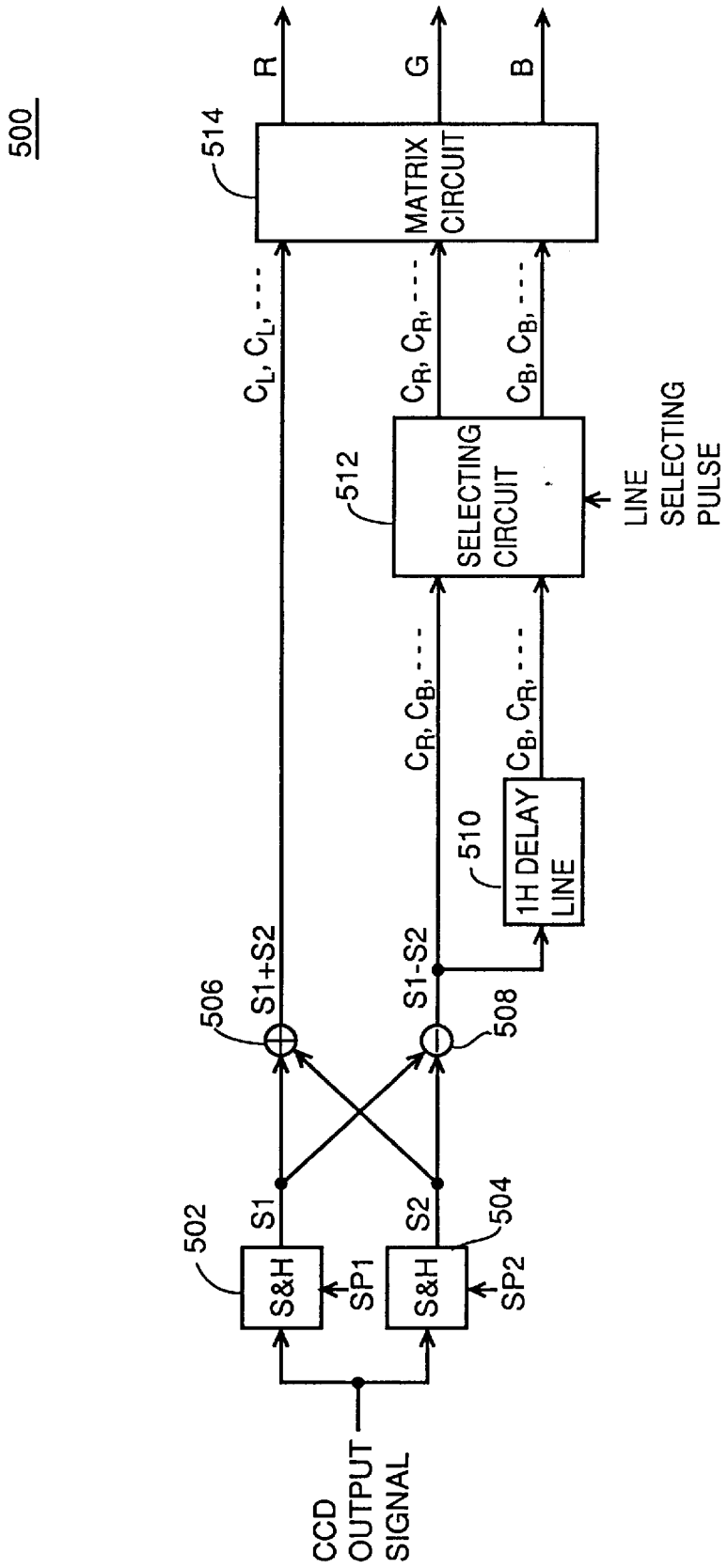
FIG. 21 is a block diagram schematically showing the structure of a conventional color separation circuit 500.
Figure 22:
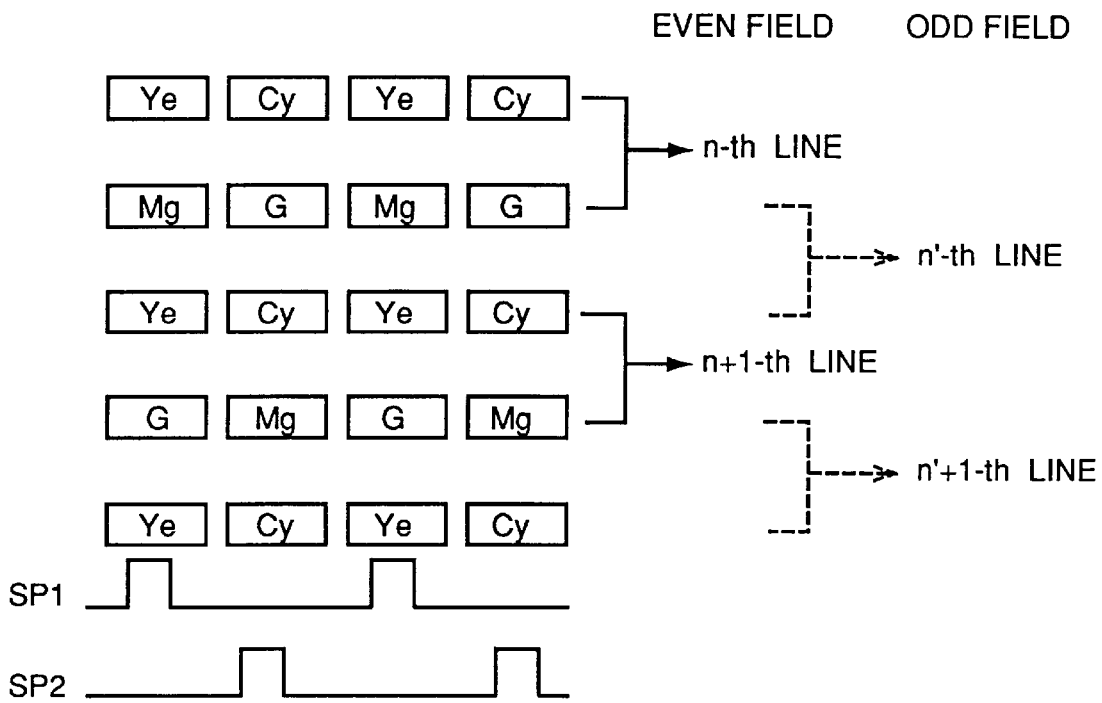
FIG. 22 is a diagram showing the arrangement of color differentially ordered color filters and the concept of interlace reading.
Figure 23:
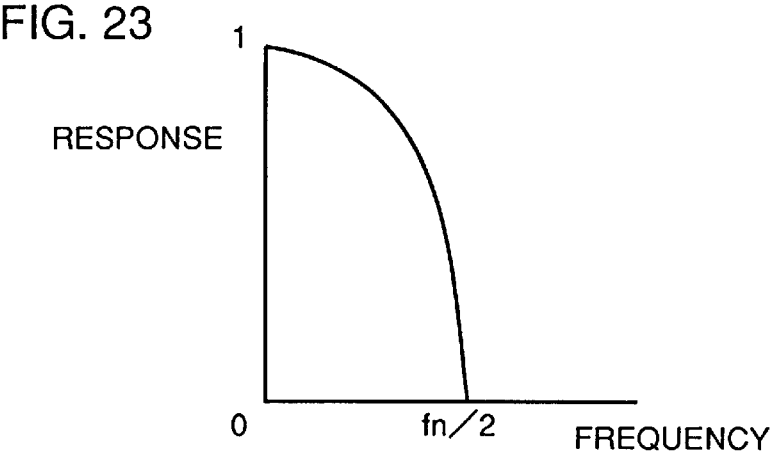
FIG. 23 is a graph representing the frequency characteristic of an output signal from the conventional color separation circuit 500.

FIG. 1 is a block diagram schematically showing the structure of a main portion of a color separation circuit 100 according to the invention in comparison with the structure of the conventional color separation circuit 200 shown in FIG. 21.

Color separation circuit 100 includes an optical system for receiving light from an object, a CCD 10 for converting an optical image formed by optical system 2 into an electrical signal, a driving circuit 102 for driving an independent reading from all the pixels, a CLCRCB generation circuit 104 for generating a luminance signal CL and color differential signals CR and CB based on an output signal received from CCD 10, a random access memory 106 (hereinafter RAM) capable of transmitting/receiving a reading signal D(x, y), luminance signal CL, and color differential signals CR and CB from CCD 10 to/from CLCRCB generation circuit 104 and storing these signals for at least two scanning lines, and a matrix circuit 108 for separating and outputting three primary color signals R, G and B from a signal received from CLCRCB generation circuit 104 through a prescribed operation.

Figures 2, 3:
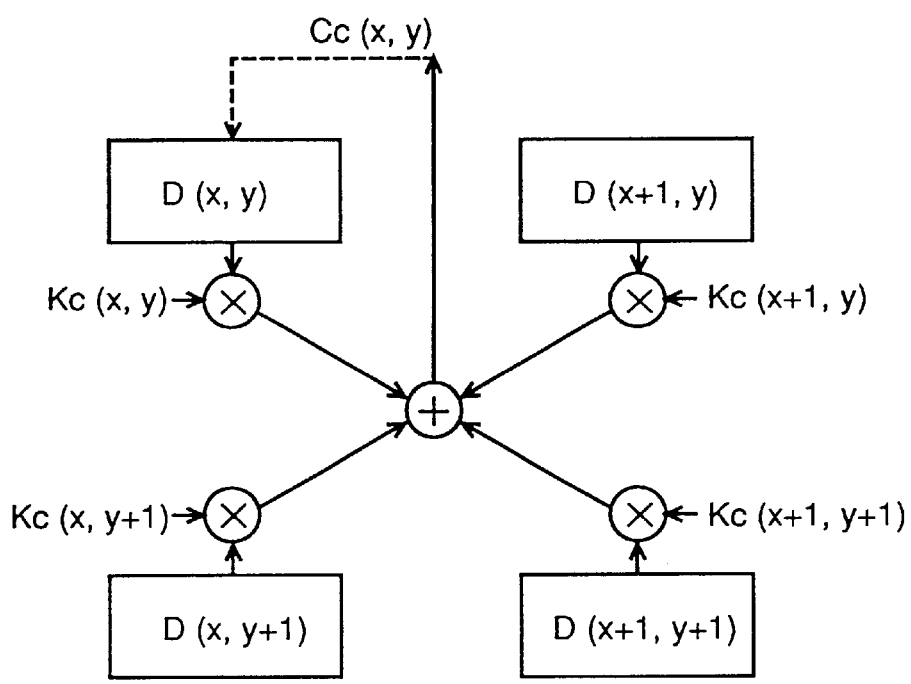
FIG. 2 is a diagram schematically showing the operation of independently reading all the pixels color differentially ordered.
FIG. 3 is a diagram schematically showing the operation of a CLCRCB generation circuit 104.

FIG. 2 is a diagram schematically showing the arrangement of a color filter array according to the embodiment and a reading of a signal from CCD 10 including the arrangement of color filter array.

Figure 17A:
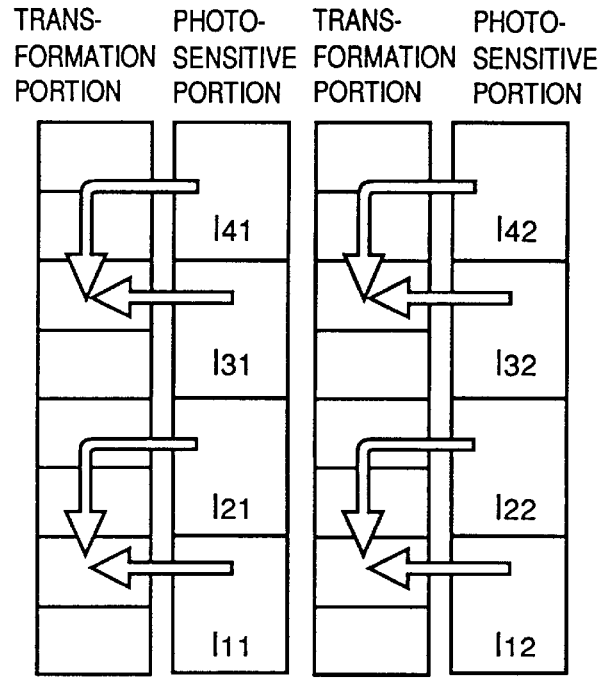
FIG. 17A shows a field accumulation reading operation for an odd-numbered field in the inter-line transfer CCD.
Figure 17B:
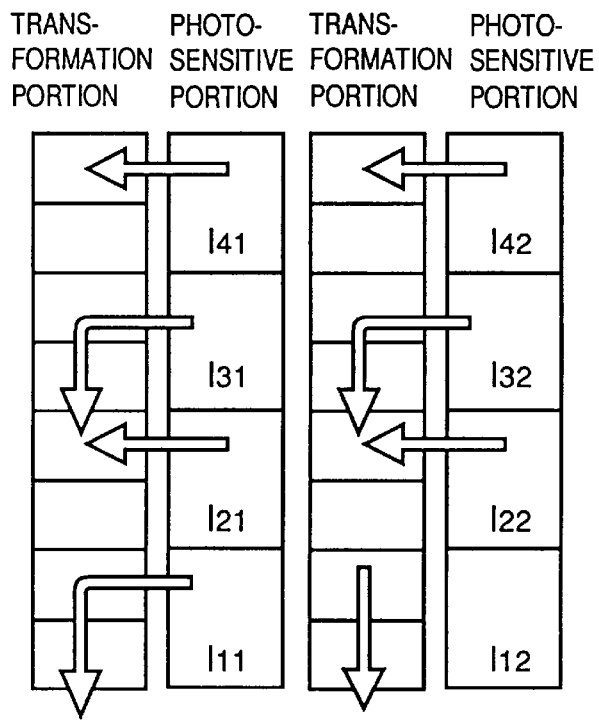
FIG. 17B is a diagram schematically showing a field accumulation reading operation for an even-numbered field.
Figure 19:
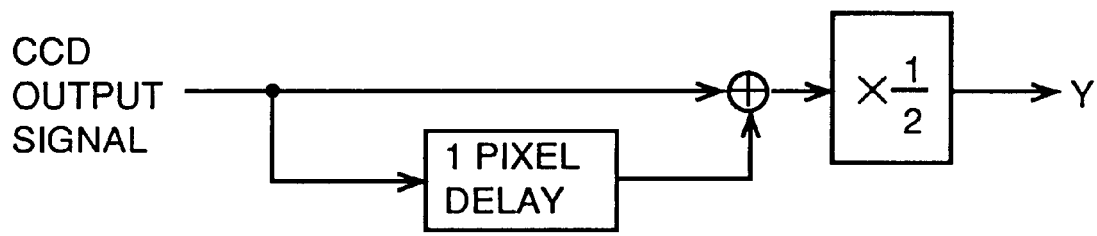
FIG. 19 is a block diagram schematically showing the structure of a low-pass filter.
Figure 20:
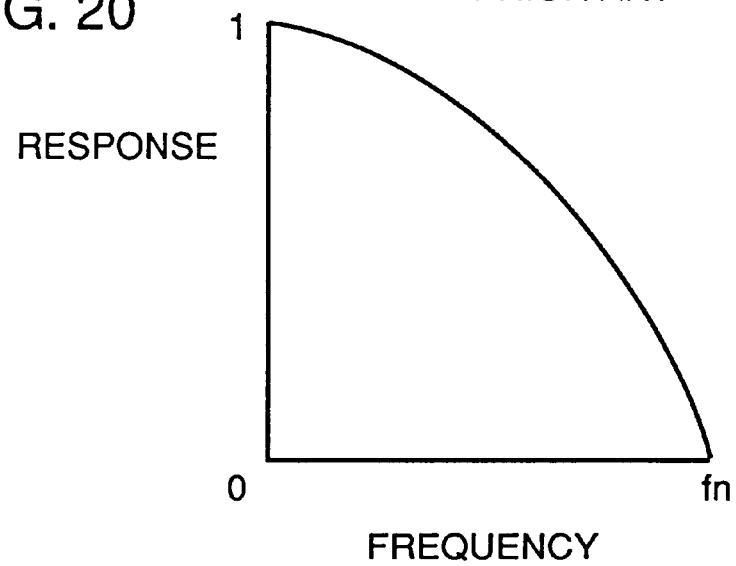
FIG. 20 is a graph representing the frequency characteristic of the low-pass filter.

As opposed to the conventional method of field additive reading as shown in FIGS. 17A and 17B, all the pixels are independently read out in this embodiment. More specifically, driving circuit 102 generates a driving pulse without mixing two pixels in the vertical direction in CCD 10 unlike the conventional example in FIG. 21. An output signal from CCD 10 is read out on a frame-basis rather than on the field-basis as shown in FIGS. 17A and 17B.

As shown in FIG. 2, since color filters Ye and Cy are alternately arranged in the horizontal direction (x-direction) for the 0-th line in the vertical direction (y-direction), Ye and Cy are alternately output as a read out signal from CCD 10 for a scanning line corresponding to the line accordingly. In the next first line (y=1), signals Mg and G are alternately output.

The relation between each pixel (x, y) and the filter color in a CCD output signal as described above may be represented as follows if n is a natural number.

i) Where y=4n−4 or y=4n−2 (i.e. y=0, 2, 4 . . . )
if x is an even number, the color of the color filter is Ye, and
If x is an odd number, the color of the color filter is Cy.

ii) Where y=4n−3 (i.e. y=1, 5, 9, . . . )
if x is an even number, the color of the color filter is Mg, and
if x is an odd number, the color of the color filter is G.

iii) Where y=4n−1 (i.e. y=3, 7, 11, . . . )
if x is an even number, the color of the color filter is G, and
if x is an odd number, the color of the color filter is Mg.

Note that in the above description, Mg and G color filters belong to odd numbered rows and Ye and Cy color filters belong to even numbered rows for ease of illustration, the present invention is not limited to such an arrangement, and is similarly applicable for example to a color filter arrangement one row shifted from this arrangement.

Now, the operation of CLCRCB generation circuit 104 when independent reading of all the pixels as described in conjunction with FIG. 2 is performed will be detailed.

FIG. 3 is a diagram schematically showing data processing in CLCRCB generation circuit 104 and data exchange with RAM 106.

First an output signal from CCD 10 is written in RAM 106. Then the data of signals D(x, y), D(x+1, y), D(x, y+1), and D(x+1, y+1) read out from CCD 10 stored in RAM 106 corresponding to pixels (x, y) is read out by CLCRCB generation circuit 104, which multiplies these signals by factors Kc(x, y), Kc(x+1, y), Kc(x, y+1), and Kc(x+1, y+1) depending on the color of a filter corresponding to each read out data, then adds up the results to generate a signal Cc(x, y) corresponding to the central position of these four pixels (x, y), (x+1, y), (x, y+1), and (x+1, y+1).

Herein the prefix c represents one of L, R and B, CL(x, y) represents a luminance signal, CR(x, y) a first color differential signal, and CB(x, y) a second color differential signal. Note that in the above definition signal Cc(x, y) is a signal corresponding to the central position of the four pixels, this is only for ease of representation, and the signal may be defined as a signal corresponding to the pixel (x, y) in a one-to-one correspondence with pixel (x, y).

More specifically, the definition may be represented as follows:

$$Cc(x, y)=Kc(x, y)\cdot D(x, y)+Kc(x+1, y)\cdot D(x+1, y)+Kc(x, y+1)\cdot D(x, y+1)+Kc(x+1, y+1)\cdot D(x+1, y+1) \quad (14)$$

In this case, the following relation is established between the color of the filter of pixel (X, Y) and factors KL(X, Y), KR(X, Y) and KB(X, Y) for generating the CLCRCB signal, wherein X=x, x+1, and Y=y, y+1.

i) Where the color of the filter of pixel (X, Y) is Cy, KL(X, Y)=1, KR(X, Y)=−1, and KB(X, Y)=1
ii) where the color of the filter of pixel (X, Y) is Ye, KL(X, Y)=1, KR(X, Y)=1, and KB(X, Y)=−1
iii) Where the color of the filter of pixel (X, Y) is Mg, KL(X, Y)=1, KR(X, Y)=1, and KB(X, Y)=1
iv) Where the color of the filter of pixel (X, Y) is G, KL(X, Y)=1, KR(X, Y)=−1, and KB(X, Y)=−1

Specific Example of Generating Luminance Signal and color Differential Signals

Based on the relation between the color of the filter and factors KL, KR and KB as described above, the process of generating a luminance signal and color differential signals in practice will be more specifically described.

As a specific example, a luminance signal and a color differential signal corresponding to the pixel (1, 2) circled in FIG. 2 will be generated according to the process as described above.

Generation of Luminance Signal CL(1, 2)

The set of pixels in two rows and two columns including the pixel (1, 2) includes pixel (1, 2), pixel (2, 2), pixel (1, 3) and pixel (2, 3).

In this case, a color filter corresponding to pixel (1, 2) is Cy, a color filter corresponding to pixel (2, 2) is Ye, a color filter corresponding to pixel (1, 3) is Mg, and a color filter corresponding to pixel (2, 3) is G.

Luminance signal CL(1, 2) produced based on expression (14) is as follows:

$$CL(1, 2) = KL(1, 2)\cdot D(1, 2) + KL(2, 2)\cdot D(2, 2) + KL(1, 3)\cdot$$

$$D(1, 3) + KL(2, 3)\cdot D(2, 3) \quad (15)$$

$$= D(1, 2) + D(2, 2) + D(1, 3) + D(2, 3) \quad (16)$$

$$= Cy + Ye + Mg + G$$

$$= (B + G) + (R + G) + (B + R) + G$$

$$= 2R + 3G + 2B \quad (17)$$

Expression (16) is formed by modifying expression (15) taking advantage of the relation between the color of the filter and factor KL(X, Y) as described above, and expression (17) is formed by modifying expression (16) using expressions (1) to (3).

Through the above-described linear operations, luminance signal CL(1, 2) corresponding to pixel (1, 2) may be obtained.

Generation of Color Differential Signal CR(1, 2)

First color differential signal CR(1, 2) may be also produced as follows based on expression (14).

$$CR(1, 2) = KR(1, 2)\cdot D(1, 2) + KR(2, 2)\cdot D(2, 2) + KR(1, 3)\cdot$$

$$D(1, 3) + KR(2, 3)\cdot D(2, 3) \quad (18)$$

$$= (-1)\cdot D(1, 2) + 1\cdot D(2, 2) + 1\cdot D(1, 3) + (-1)\cdot$$

$$D(2, 3) \quad (19)$$

$$= (-1)(B + G) + (R + G) + (B + R) - G$$

$$= 2R - G \quad (20)$$

Expression (19) is formed by modifying expression (18) taking advantage of the relation between the color of the filter of pixel (X, Y) and factor KR(X, Y), and expression (20) is formed by modifying expression (19) using expressions (1) to (3).

Through the above-described linear operation, first color differential signal CL(1, 2) corresponding to pixel (1, 2) may be produced.

Generation of Color Differential Signal CB(1, 2)

Second color differential signal CB(1, 2) may be also produced as follows similarly to the case of first color differential signal CB(1, 2).

$$CB(1, 2) = KB(1, 2) \cdot D(1, 2) + KB(2, 2) \cdot D(2, 2) + KB(1, 3) \cdot$$
$$D(1, 3) + KB(2, 3) \cdot D(2, 3) \quad (21)$$
$$= 1 \cdot D(1, 2) + (-1) \cdot D(2, 2) + 1 \cdot D(1, 3) + (-1) \cdot$$
$$D(2, 3) \quad (22)$$
$$= (B + G) - (R + G) + (B + R) - G$$
$$= 2B - G \quad (23)$$

Expression (22) is formed by modifying expression (21) also taking advantage of the relation between the color of the filter of pixel (X, Y) and factor KB(X, Y), and expression (23) is formed by modifying expression (22) using expressions (1) to (3).

As described above, luminance signal CL and color differential signals CR and CB may be generated corresponding to each of the pixels constituting CCD 10.

Since such a straightforward relation is established between pixel (x, y) corresponding to a CCD output signal and the color of the color filter, CLCRCB generation circuit 104 may generate luminance signal CL and color differential signals CR and CB through the above-described operation based on the relation.

Separation of RGB Signal

Now, the operation of matrix circuit 108 as shown in FIG. 1 will be described.

Matrix circuit 108 separates a RGB signal corresponding to each of the pixels of the CCD through the following operations to output signal CL, signal CR and signal CB received from CLCRCB generation circuit 104.

$$G(x, y) = \{2CL(x, y) - 2CR(x, y) - 2CB(x, y)\}/10 \quad (24)$$
$$R(x, y) = \{CL(x, y) + 4CR(x, y) - CB(x, y)\}/10 \quad (25)$$
$$B(x, y) = \{CL(x, y) - CR(x, y) + 4CB(x, y)\}/10 \quad (26)$$

Therefore, an RGB signal may be generated for each of all the pixels in CCD 10. As opposed to a conventional color separation circuit, a resulting horizontal resolution is H−1, and a resulting vertical resolution is V−1.

The meaning of "−1" used in the horizontal and vertical resolutions is that an RGB signal is produced corresponding to a single pixel (x, y) included in the set of pixels arranged in two rows and two columns according to this embodiment, and therefore the number of effective columns/rows in the pixel array is reduced by one both in the horizontal and vertical directions because the set of pixels in two rows and two columns can not be picked up any longer with respect to the last column or row.

In the foregoing description, although the color differentially ordered arrangement as shown in FIG. 2 is employed as an example of the arrangement of color filter array, the present invention is not limited to such an arrangement, and also applicable to other arrangements of color filter array by changing factors KL, KR and KB accordingly.

Second Embodiment

In the first embodiment shown in FIG. 1, color separation circuit 100 exchanges signal D(x, y), luminance signal CL, and color differential signals CR and CB from CCD 10 with CLCRCB generation circuit 104, and includes RAM 106 capable of storing these signals for at least two scanning lines.

Alternatively, after storing one frame of signals D(x, y) read out from CCD 10 all in a so-called frame memory, luminance signal CL, first and second color differential signals CR and CB can be generated by processing by the CLCRCB generation circuit based on the read out signals within the frame memory.

Figure 4:
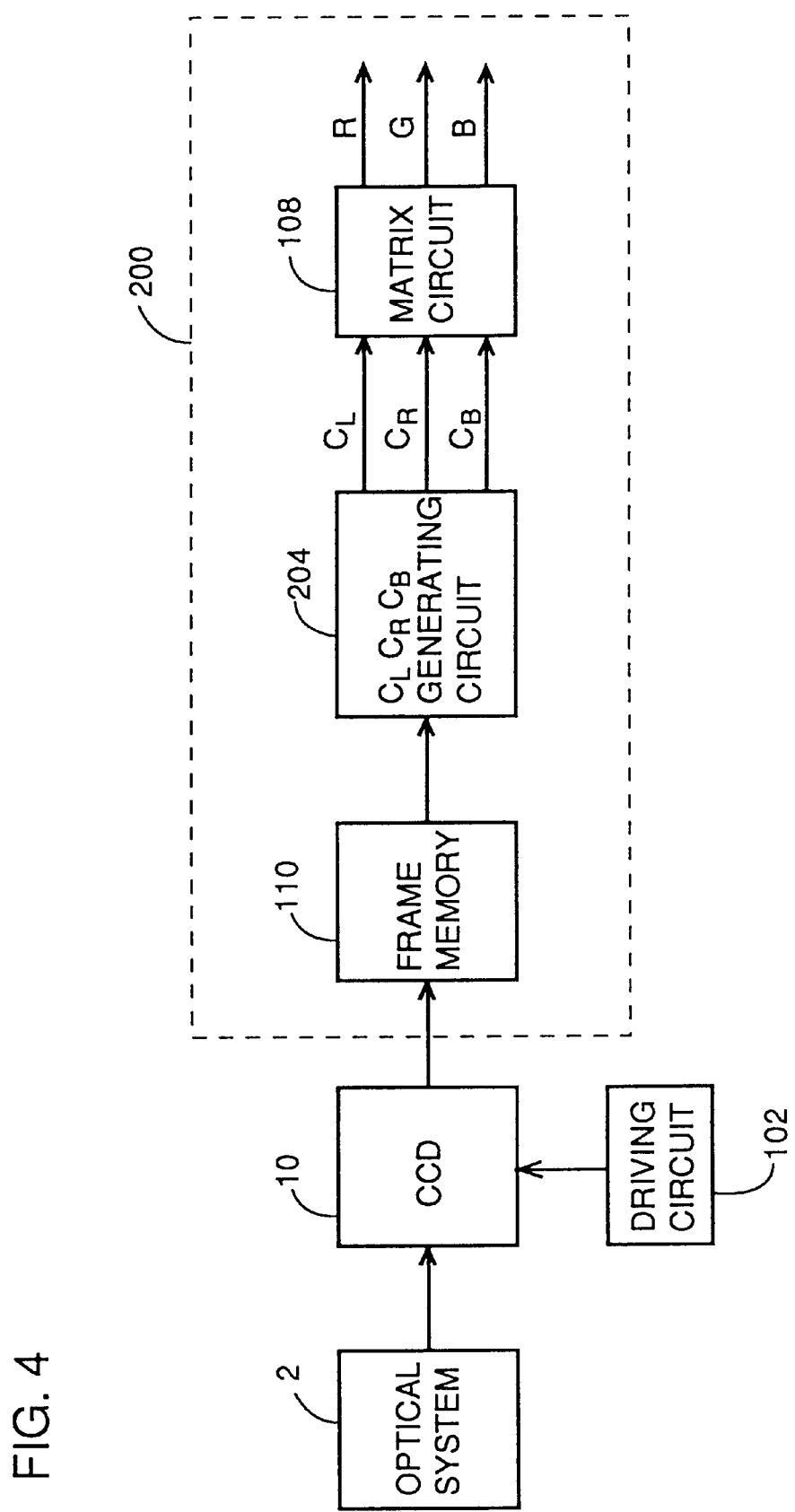
FIG. 4 is a block diagram schematically showing the structure of a main portion of a color separation circuit 200 in a single CCD type color camera according to a second embodiment of the invention.

FIG. 4 is a block diagram schematically showing the structure of a main portion of a color separation circuit 200 according to a second embodiment of the invention having such a structure.

More specifically, color separation circuit 200 includes a frame memory 110 for storing the entire one frame of signals D(x, y) read out from CCD 10, and CLCRCB generation circuit 204 generates luminance signal CL, first and second color differential signals CR and CB based on data received from the frame memory, as opposed to the structure of color separation circuit 100 according to the first embodiment. Since the other features are similar to the structure of color separation circuit 100 according to the first embodiment, and therefore the same portions are attached with the same reference numerals and characters and the description will not be repeated.

In color separation circuit 200 according to the second embodiment, luminance signal CL and first and second color differential signals CR and CB are generated according to the process represented by expression (14) in the first embodiment.

Figure 5:
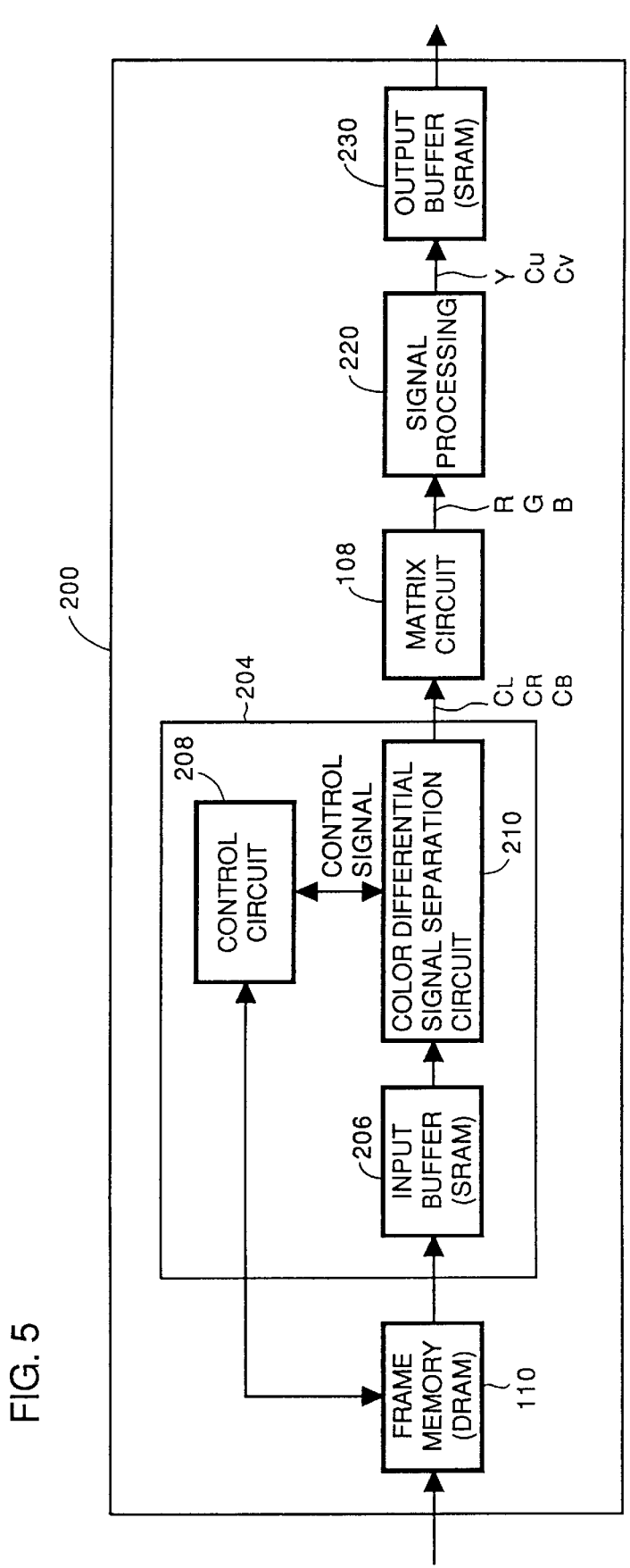
FIG. 5 is a block diagram showing in detail the structure of color separation circuit 200.

FIG. 5 is a block diagram showing more in detail the structure of CLCRCB generation circuit 204 in the structure shown in FIG. 4. Note that in FIG. 5 color separation circuit 200 includes a signal processing circuit 200 for producing video signals (i.e. luminance signal Y and color differential signals Cu and Cv produced through well known gamma correction and white balance correction) in response to a signal received from matrix circuit 108, and an output buffer 230 externally outputting the video signal received from signal processing circuit 220.

Color separation circuit 200 may be implemented as an ASIC (application-specific integrated circuit).

Though not specified, frame memory 110 can form a dynamic random access memory (hereinafter DRAM) having a storage capacity for H×V pieces of pixel data where the number of horizontal pixels is H and the number of vertical pixels is V in CCD 10.

CLCRCB generation circuit 204 includes an input buffer 206 receiving from frame memory 110, one block of data corresponding to a plurality of pixels necessary for a prescribed image processing, a control circuit 208 controlling addressing of a data block to be read out from frame memory 110, and a color differential signal separation circuit 210 controlled by control circuit 208 for performing a separation processing to one block of data in the input buffer to obtain for each pixel luminance signal CL, and first and second color differential signals CR and CB.

If a standard image data compression processing, JPEG (Joint Photographic Coding Experts Group) coding is performed as the prescribed image processing, input buffer 206 stores data corresponding to 9×9 pixels as one block.

This is because the JPEG coding is performed to data of 8×8 pixels as a unit, data for 9×9 pixels will be necessary in order to generate luminance signal CL and first and second color differential signals CL and CB corresponding to each of the 8×8 pixels, if these signals are generated for one pixel from data for 2×2 pixels described in the first embodiment.

Input buffer 206, though not specified, can be formed of a static random access memory (hereinafter SRAM) having a capacity of storing data for the above 9×9 pixels.

Color differential signal separation circuit 210 is controlled by control circuit 208 to sequentially read out data for 2×2 pixels among data for 9×9 pixels stored in input buffer 206, and generates luminance signal CL, and first and second color differential signals CR and CB depending upon the color of a color filter corresponding to each pixel and according to expression (14).

Matrix circuit 108 receives an output from color differential signal separation circuit 210, outputs three primary color signals R, G and B corresponding to the central position of each of 2×2 pixels, and signal processing circuit 220, though not limited, generates video signals (i.e. luminance signal Y and color differential signals Cv and Cu produced through well known gamma correction and white balance correction) based on the primary color signals.

Herein, the video signals are represented by the following expressions:

$$Y=0.2990 \times R+0.5870 \times G+0.1140 \times B$$

$$Cu=-0.1684 \times R-0.3316 \times G+0.5000 \times B$$

$$Cv=0.5000 \times R-0.4187 \times G-0.0813 \times B$$

Output buffer 230 accumulates one block of video signals (data for 8×8 pixels in the JPEG coding) output from signal processing circuit 220, and externally outputs the data on a block-basis.

Output buffer 230 can be formed of an SRAM having a capacity of storing data for 8×8 pixels as described above, though not limited thereto.

Based on an output from output buffer 230, a JPEG coding circuit (not shown) performs a JPEG coding, and the coded data is for example stored in a flash memory.

The above-described processing is repeatedly performed to one frame of data stored in frame memory 110, and compressed data corresponding to images for one frame is consequently stored in the flash memory.

Figure 6:
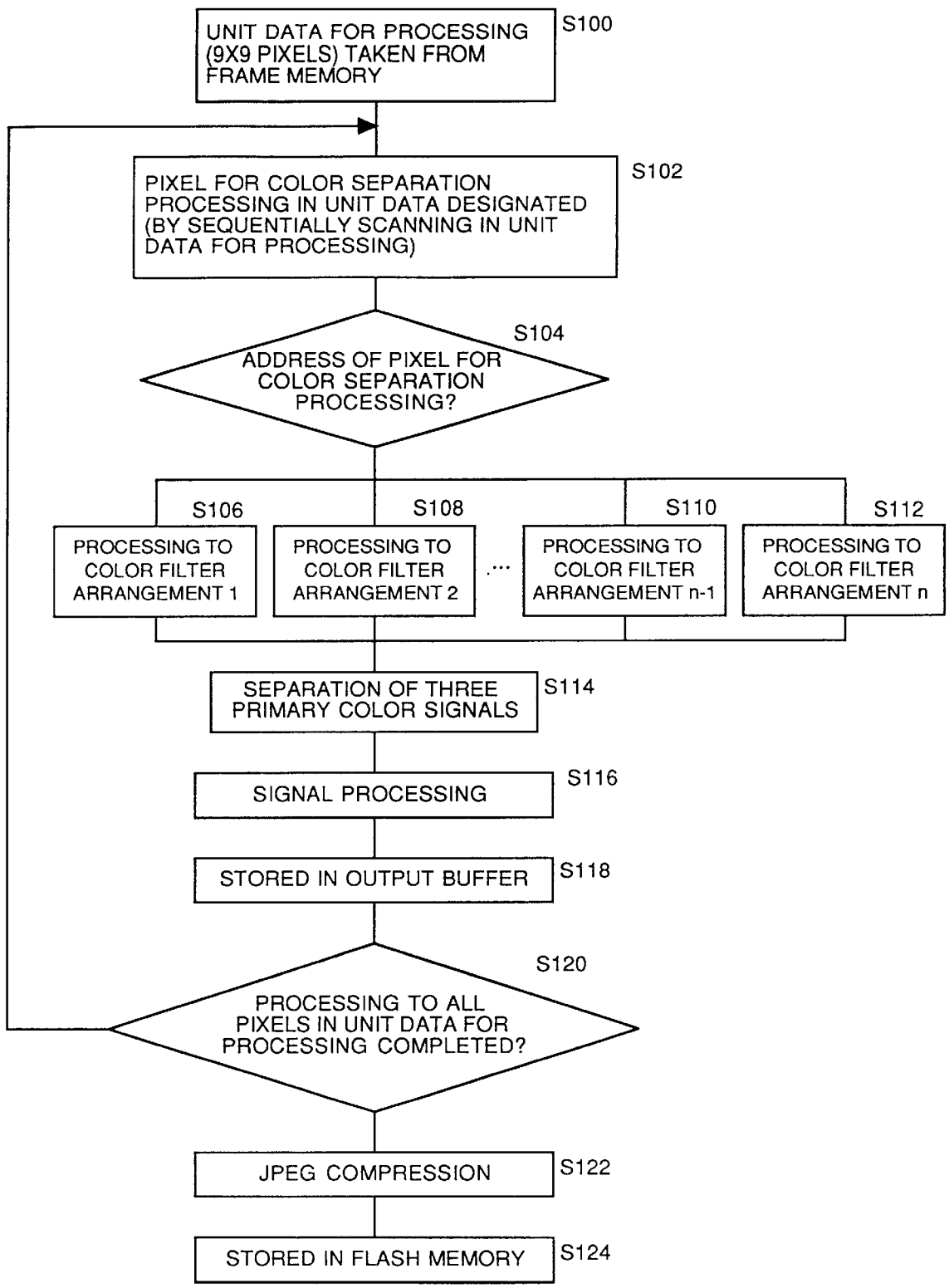
FIG. 6 is a flow chart for use in illustration of the operation of color separation circuit 200.

FIG. 6 is a flow chart for use in illustration of the operation of color separation circuit 200 shown in FIG. 5.

Referring to FIG. 6, input buffer 206 is controlled by control circuit 208 to take in a unit data block for processing (data for 9×9 pixels) (step S100).

Color differential signal separation circuit 210 then receives data for 2×2 pixels to perform a separation processing of color differential signals from the unit data in input buffer 206 in response to an address designated by control circuit 208 (step S102).

Color differential signal separation circuit 210 performs the processing represented by expression (14) depending on the color of a color filter corresponding to each pixel, which is defined based on the addresses of the 2×2 pixels (x, y), (x+1, y), (x, y+1) and (x+1, y+1). More specifically, in the arrangement of color filters shown in FIG. 2, if there are arrangements 1 to n for color filters corresponding to the 2×2 pixels, a processing corresponding to arrangement i (i=1, 2, . . . , n) for the 2×2 pixels whose data has been taken in is performed (steps S106 to S112).

Matrix circuit 108 receives an output from color differential signal separation circuit 210 and outputs three primary color signals R, G and B corresponding to the central position of each of 2×2 pixels (step S114).

Signal processing circuit 220 then generates an NTSC signal, video signals Y, Cu, Cv based on the three primary color signals (step S116).

Output buffer 230 accumulates video signals output from signal processing circuit 220 (step S118).

Then, it is determined whether or not color differential signal separation processing to one block of data (data for 9×9 pixels) stored in input buffer 206 has been completed (step S120).

If the processing to one block of data has not been completed, the processing returns to S102 (step S120).

If the processing has been completed (step S120), Y, Cu and Cv data corresponding to 8×8 pixels is output from output buffer 230, and the JPEG coding circuit performs a JPEG coding (image data compression processing) to the received data (step S122).

The coded data is also stored in the flash memory (step S124).

The above-described processing is repeatedly performed to one frame of data stored in frame memory 110, and the one frame of image data is compressed and stored.

In color separation circuit 200 according to the second embodiment, RGB signals may be generated corresponding to each of all the pixels in CCD 10 as is the case with color separation circuit 100 in the first embodiment. Therefore, improved resolution, H−1 in the horizontal direction and V−1 in the vertical direction is implemented as compared to the conventional color separation circuit.

In color separation circuit 200 according to the second embodiment, the arrangement of the color filter array is not limited to the color differentially ordered arrangement as shown in FIG. 2, but the invention is applicable to other color filter array arrangements by changing factors KL, KR and KB accordingly.

Third Embodiment

A color separation circuit 300 according to a third embodiment of invention has basically the same structure as that of color separation circuit 100 according to the first embodiment. However, as will be described below, the third embodiment is directed to restriction of generation of a ghost color signal by replacing CLCRCB generation circuit 104 with CLCRCB generation circuit 304.

Figure 7:
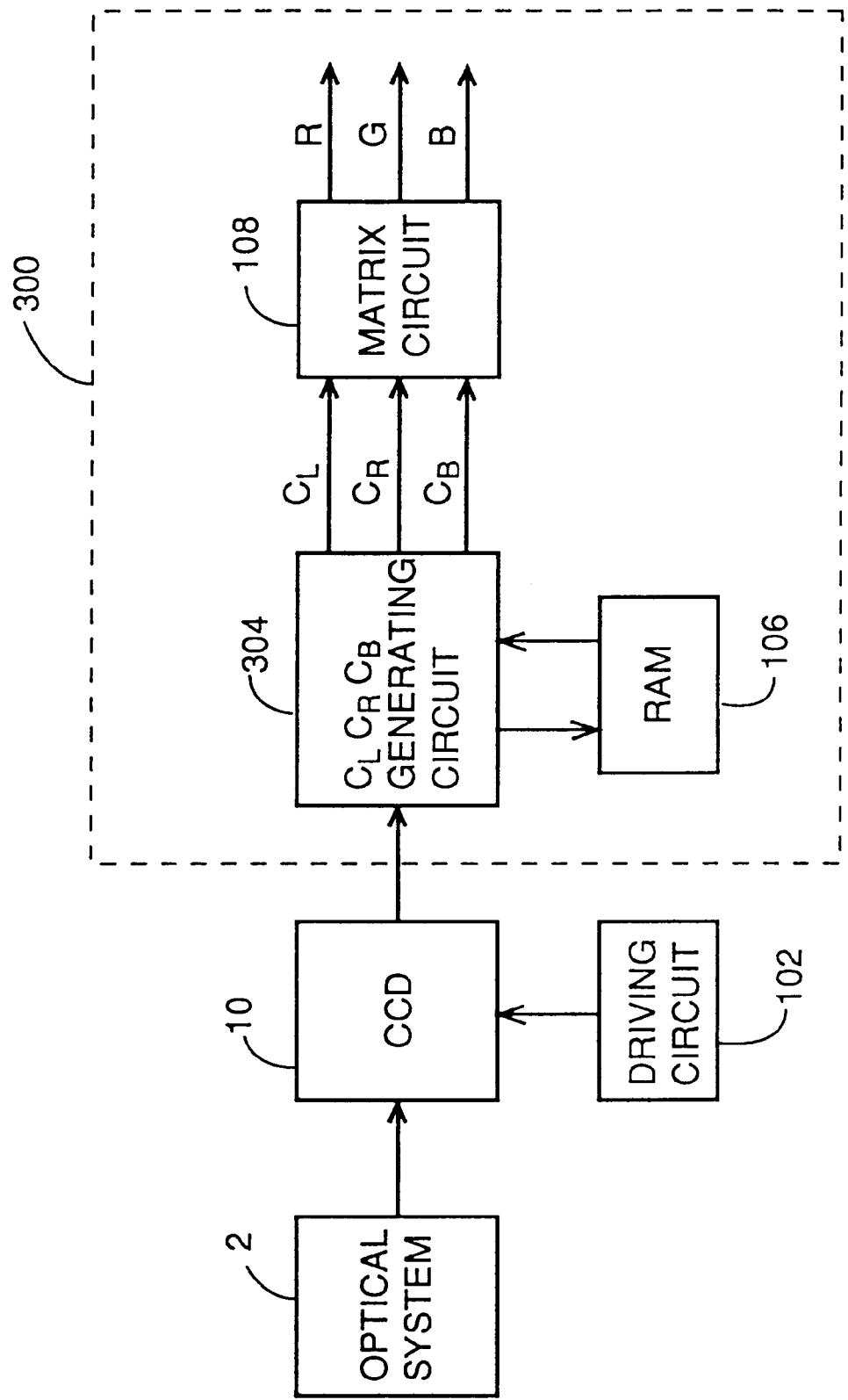
FIG. 7 is a block diagram schematically showing the structure of a main portion of a color separation circuit 300 according to a third embodiment of the invention.

More specifically, the structure of color separation circuit 300 according to the third embodiment shown in FIG. 7 is essentially identical to color separation circuit 100 according to the first embodiment shown in FIG. 1 with a difference being that CLCRCB generation circuit 104 is replaced with CLCRCB generation circuit 304.

FIG. 8 is a diagram schematically showing the arrangement of color filter array according to the embodiment and how a signal is read out from CCD 10 having such a color filter array.

Also in this embodiment, CCD 10 performs an independent reading operation to all the pixels. More specifically, driving circuit 102 generates a driving pulse without mixing two pixels in the vertical direction. An output signal from CCD 10 is a so-called frame reading signal rather than a field reading signal shown in FIG. 17.

Since color filters Mg and G are alternately arranged in the horizontal direction (x-direction) in the 0-th line in the vertical direction (y-direction), Mg and G are alternately output as a signal read out from CCD 10 for a scanning line corresponding the line. In the next first line (y=1), signals Ye and Cy are alternately output.

The relation between each pixel (x, y) in a CCD output signal and a filter color as described above may be represented as follows if n is a natural number.

i) Where y=4n−3 or 4n−1 (i.e. y=1, 3, 5 . . . )

if x is an even number, the color of the color filter is Ye, and if x is an odd number, the color of the color filter is Cy.

ii) Where y=4n−4 (i.e. y=0, 4, 8 . . . )

if x is an odd number, the color of the color filter is Mg, and if x is an even number, the color of the color filter is G.

iii) Where y=4n−2 (i.e. y=2, 6, 10 . . . )
if x is an odd number, the color of the color filter is G, and
if x is an even number, the color of the color filter is Mg.

Note that in the above description, Mg and G color filters belong to even numbered rows and Ye and Cy color filters belong to odd numbered rows for ease of illustration, the present invention is not limited to such an arrangement, and is similarly applicable for example to a color filter arrangement one row shifted from this arrangement.

Generation of Color Differential Signals from Four Pixels Fixed to Pixel (x, y)

As described above, in this embodiment, output signals are independently read out from all the pixels in CCD 10, and these signals are stored in RAM 106.

Therefore, luminance signal CL(x, y), first color differential signal CR(x, y) and second color differential signal CB(x, y) may be generated for each pixel (x, y) through the following operations.

Herein an output signal from a photoelectric conversion element corresponding to pixel (x, y) in CCD 10 is represented as D(x, y).

As in the description of the first embodiment, a luminance signal and two color differential signals can be extracted through the linear operation represented by expression (14) to output signals from pixels (x, y), (x+1, y), (x, y+1) and (x+1, y+1) in two rows and two columns including pixel (x, y).

Now, how a luminance signal and color differential signals are generated will be more specifically described based on the relation between the colors of filters and factors KL, KR and KB for the purpose of clarifying problems associated with color separation processing according to the first embodiment.

A luminance signal and color differential signals corresponding to pixel (0, 0) shown in FIG. 8 will be produced by way of illustration.

If expressions (1) to (3) hold, luminance signal CL (0, 0) will be represented by the following expression (27):

$$CL(0,0) = D(0,0) + D(1,0) + D(0,1) + D(1,1) \quad (27)$$
$$= Mg + G + Ye + Cy$$
$$= (R+B) + G + (R+G) + (B+G)$$
$$= 2R + 3G + 2B$$

First color differential signal CR (0, 0) will be produced from the following expression (28):

$$CR(0,0) = D(0,0) + D(0,1) - D(1,0) - D(1,1) \quad (28)$$
$$= Mg + Ye - G - Cy$$
$$= (R+B) + (R+G) - G - (B+G)$$
$$= 2R - G$$

Meanwhile, second color differential signal CB (0, 0) is produced by the following expression (29):

$$CB(0,0) = D(0,0) + D(1,1) - D(0,1) - D(1,0) \quad (29)$$
$$= Mg + Cy - Ye - G$$
$$= (R+B) + (B+G) - (R+G) - G$$
$$= 2B - G$$

More specifically, the luminance signal and two color differential signals for pixel (0, 0) can be produced using output signals from pixels (0, 0), (1, 0), (0, 1), and (1, 1).

While in the above example, pixel of interest (0, 0) corresponds to a magenta color filter, if a pixel of interest corresponds to another color filter, a luminance signal and color differential signals may be produced through a linear operation of output signals from pixels (x, y), (x+1, y), (x, y+1), and (x+1, y+1) in two rows and two columns including that pixel (x, y).

Therefore, a luminance signal and two color differential signals can be produced for each pixel, and therefore a color separation circuit with a higher resolution than a conventional color separation circuit can be advantageously implemented.

Problems Associated with Generation of Color Differential Signals from Fixed Four Pixels The method of color separation as described above is however encountered with problems as follows.

i) If Luminance Changes in the Horizontal Direction

As shown in FIG. 8, the intensity of light incident to the arrangement of CCD pixels has a change H1 in luminance level in the horizontal direction (an edge where the luminance level changes between the left and right end of the picture plane) will be considered. In the following, for ease of description, assume that a neutral color optical signal without any color component is incident to the edge portion and only the luminance level changes.

At the edge portion, the luminance level changes by b/a (b>a) toward the horizontal direction (x-axis).

A luminance signal and color differential signals for pixel (0, 0) will be produced as follows by way of illustration.

Luminance signal CL (0, 0) may be produced as follows:

$$CL(0,0) = D(0,0) + D(1,0) + D(0,1) + D(1,1) \quad (30)$$
$$= a \times Mg + b \times G + a \times Ye + b \times Cy$$
$$= a \times (R + B + R + G) + b \times (2G + B)$$

First color differential signal CR(0, 0) may be produced as follows:

$$CR(0,0) = D(0,0) + D(1,0) - D(0,1) - D(1,1) \quad (31)$$
$$= a \times Mg + a \times Ye - b \times G - b \times Cy$$
$$= a \times (R + B + R + G) - b \times (2G + B)$$

Second color differential signal CB(0, 0) may be produced as follows:

$$CB(0,0) = D(0,0) + D(1,1) - D(0,1) - D(1,0) \quad (32)$$
$$= a \times Mg + b \times Cy - a \times Ye - b \times G$$
$$= a \times (R + B - R - G) + b \times B$$

Herein, assuming that there is no color component, the following two expressions are established.

2R−G=0

2B−G=0

For 2R=2B=G=2S, R=S, B=S, and G=2S are substituted in the above expressions (30) to (32), the following results are obtained for the first and second color differential signals.

$$CR(0, 0) = -5S(b-a) \quad (33)$$
$$CB(0, 0) = S(b-a) \quad (34)$$

Therefore, a color differential signal is generated for pixel (0, 0) which essentially should not have any color component. As a result, a ghost color appears on the picture plane, resulting in picture quality deterioration.

Similarly, if there is a luminance level change H2 in the horizontal direction as shown in FIG. 8, color differential signals for pixel (1, 0) will be produced as follows:

$$CR(1, 0) = 5S(b-a) \tag{35}$$

$$CB(1, 0) = -S(b-a) \tag{36}$$

Therefore, a ghost color is generated for luminance level change H2 in pixel (1, 0).

This applies to all the pixels having edges of luminance change in the horizontal direction.

ii) If Luminance Changes in the Vertical Direction

Now, as shown in FIG. 8, if there is a luminance change V1 in the vertical direction, color differential signals may be produced for pixel (0, 2) as follows.

Color differential signal CR (0, 2) will be produced as follows:

$$\begin{aligned} CR(0, 2) &= D(1, 2) + D(0, 3) - D(0, 2) - D(1, 3) \\ &= b \times Mg + a \times Ye - b \times G - a \times Cy \\ &= a \times (R + G - G - B) + b \times (R + B - G) \end{aligned} \tag{37}$$

Color differential signal CB (0, 2) will be produced as follows:

$$\begin{aligned} CB(0, 2) &= D(1, 2) + D(1, 3) - D(0, 2) - D(0, 3) \\ &= b \times Mg + a \times Cy - b \times G - a \times Ye \\ &= a \times (G + B - R - G) + b \times (R + B - G) \end{aligned} \tag{38}$$

Herein, for 2R=2B=G=2S, CR(0, 2)=0 and CB(0, 2)=0 are obtained.

It shows that no ghost color is generated in the vertical direction.

Similarly, for luminance signal change V2 in the vertical direction as shown in FIG. 8, the values of color differential signals for the pixel at the edge portion are both 0, which shows that no ghost color is generated for edges in the vertical direction.

As described above, in the method of producing color differential signals based on output signals from pixels (x, y), (x+1, y), (x, y+1), and (x+1, y+1) in two rows and two columns including pixel (x, y), a ghost color is generated if there exists a great luminance change (edge) in the horizontal direction. If the image is reproduced on the picture plane, the ghost color appears at the portion essentially without any color, which results in picture quality deterioration. Also in the process of producing R, G and B signals for three primary colors from signals CL, CR and CB, a ghost luminance signal is generated because of a ghost color signal component, resulting in deterioration of the luminance signal.

Relation Between Generation of Ghost Color Signal and Color Filter Arrangement

As described above, in the arrangement of color differentially ordered color filters as shown in FIG. 8, a ghost color is generated if there is a great luminance change in the horizontal direction.

Now, the relation between a pixel to cause such a ghost color and the arrangement of color filters will be considered.

Figure 9A:
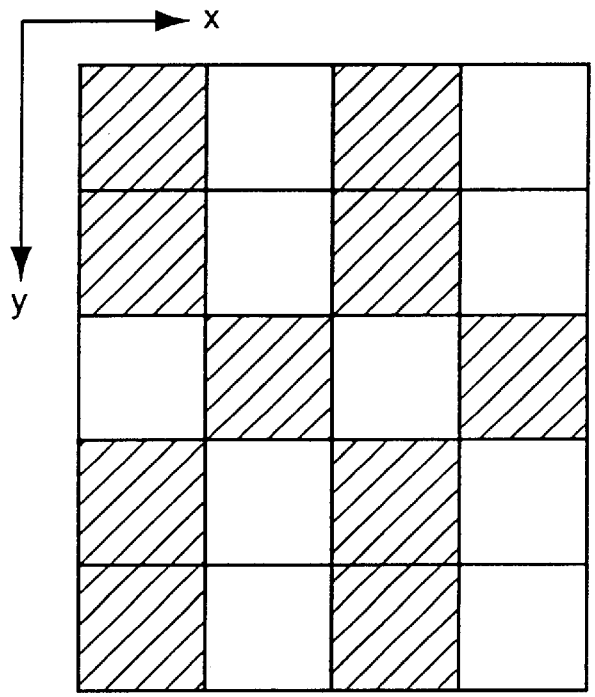
FIG. 9A is a diagram for use in illustration of the arrangement of pixels to output an R signal component in the color filter array arrangement shown in FIG. 8, with FIG. 9B showing the arrangement of pixels to output a B signal component.
Figure 9B:
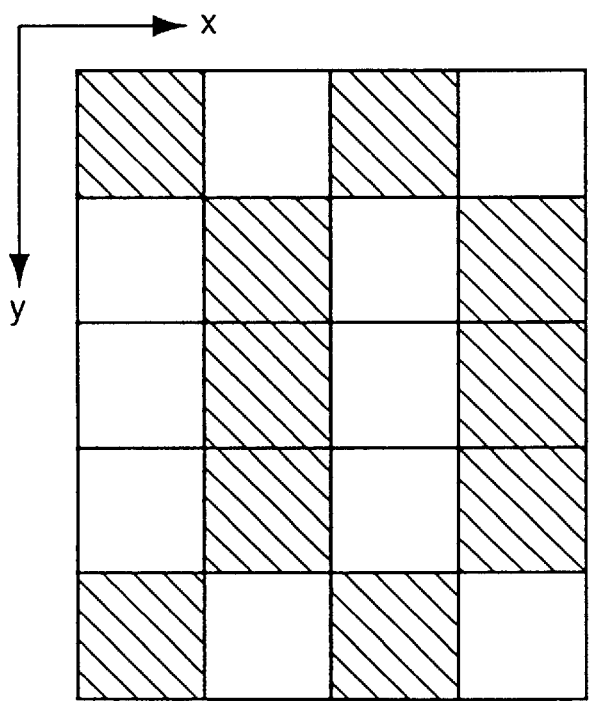

FIG. 9A is a diagram showing the arrangement of filters to output a color signal including an R signal component for the color filter array in FIG. 2, with the arrangement of pixels to output the signal having the R signal component being shaded. FIG. 9B is a diagram showing the arrangement of pixels to output a signal including a B signal component being shaded.

In view of expressions (1) to (3), the R signal is included in output signals from pixels corresponding to a magenta color filter and a yellow color filter among the arrangement of color filters in FIG. 8. Meanwhile, the B signal component is included in output signals from pixels corresponding to a magenta color filter and a cyan color filter.

Now, the case in which a luminance signal change H1 exists in the horizontal direction as shown in FIG. 8 will be considered.

In view of pixel (0, 0), among output signals from a set of pixels in two rows and two columns including the pixel, an output signal having an R signal component is obtained only from the side of lower luminance level, and there is no R signal component on the side of higher luminance level.

A large ghost color signal component is generated in color differential signal CR(0, 0) accordingly.

Meanwhile, among the pixels in the two rows and two columns including pixel (0, 0), a pixel to output a signal having a B signal component exists on both sides of higher and lower luminance levels.

A ghost color signal for color differential signal CB (0, 0) has an absolute value smaller than a ghost color signal component appearing for color differential signal CR (0, 0).

If an edge exists in the luminance signal change, and a color differential signal to obtain is a CR signal, the color differential signal CR needs to be produced based on signals from a set of pixels in two rows and two columns in which pixels to output a R signal component are diagonally arranged in order to suppress generation of a ghost color signal. This also applies to color differential signal CB.

Operation of CLCRCB Generation Circuit 304

Now, a method of color separation which suppresses such a ghost color signal will be described.

More specifically, the operation of CLCRCB generation circuit 304 will be described when an independent reading is performed to all the pixels in CCD 10 as shown in FIG. 7.

For ease of describing a method of generating color differential signals in a figure, the method is expressed as producing a luminance signal and color differential signals for a pixel in the center of four pixels in two rows and two columns based on output signals from the pixels.

Note however that the method may be expressed as generating color differential signals for pixel (x, y) from output signals in two rows and two columns of pixels (x, y), (x+1, y), (x, y+1), and (x+1, y+1) including the pixel. In this case, if the luminance signal and color differential signals for pixel (x, y) among these four pixels are assumed to be a luminance signal and color differential signals for the central position, the expression is substantially the same as following description.

If an output signal D(x, y) is for example a magenta color filter, the signal is specifically expressed as Mg(x, y).

FIGS. 10 to 13 are diagrams for use in illustration of the operation of CLCRCB generation circuit 304 in color separation circuit 300 according to the invention.

Figure 10:
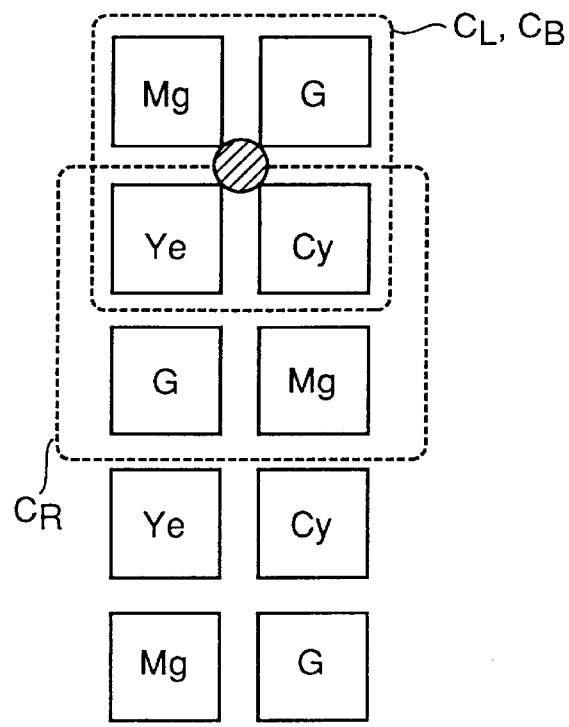
FIGS. 10 to 13 are first to fourth schematic diagrams for use in illustration of the operation of a CLCRCB generation circuit 304 according to the third embodiment of the invention.

FIG. 10 shows a set of pixels in two rows and two columns used in calculating color differential signals in the central position surrounded by pixels (0, 0), (1, 0), (0, 1) and (1, 1).

Figure 11:
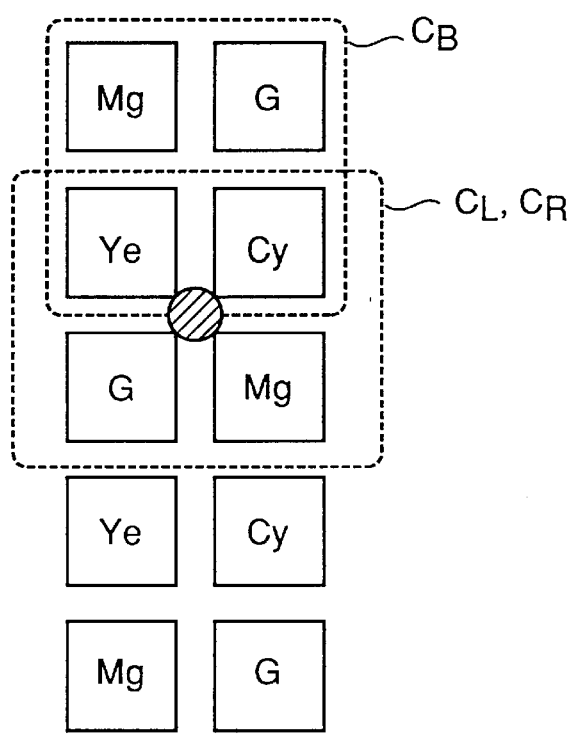

FIG. 11 shows a set of pixels in two rows and two columns used in calculating color differential signals in the central position surrounded by pixels (0, 1), (1, 1), (0, 2) and (1, 2) shown in FIG. 8.

Figure 12:
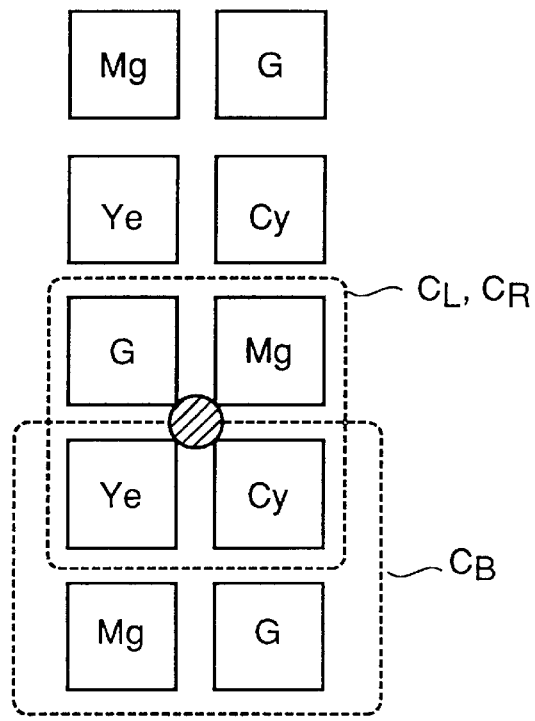

FIG. 12 shows a set of pixels in two rows and two columns used in calculating color differential signals in the central position surrounded by pixels (0, 2), (1, 2), (0, 3) and (1, 3) shown in FIG. 8.

Figure 13:
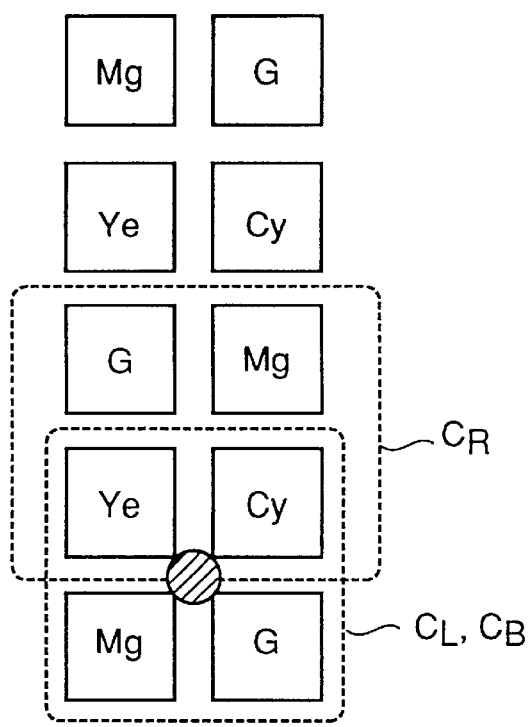

FIG. 13 shows a set of pixels in two rows and two columns used in calculating color differential signals in the central position surrounded by pixels (0, 3), (1, 3), (0, 4) and (1, 4) as shown in FIG. 8.

However, the selection of pixels in two rows and two columns for calculating a luminance signal or color differential signals as shown in FIGS. 10 to 13 is more generally applicable to an operation of any central position surrounded by pixels in the same arrangement, as will be described later.

Referring to FIG. 10, luminance signal CL and color differential signal CB in the central position surrounded by pixels (0, 0), (1, 0), (0, 1) and (1, 1) are both calculated based on output signals from these four pixels. Meanwhile, color differential signal CR is calculated based on output signals from a set of pixels in two rows and two columns shifted by one pixel in the y-direction.

Referring to FIG. 11, the luminance signal and color differential signal CR in the central position surrounded by pixels (0, 1), (1, 1), (0, 2) and (1, 2) are calculated based on output signals from these four pixels. Meanwhile, color differential signal CB is calculated from a set of pixels in two rows and two columns shifted by one pixel in the -y-direction.

Referring to FIG. 12, luminance signal CL and color differential signal CR corresponding to the central position surrounded by pixels (0, 2), (1, 2), (0, 3) and (1, 3) are calculated from the four pixels in two rows and two columns.

Meanwhile, color differential signal CB is calculated based on output signals from pixels in two rows and two columns shifted by one pixel in the y-direction.

Referring to FIG. 13, luminance signal CL and color differential signal CB in the central position surrounded by pixels (0, 3), (1, 3), (0, 4) and (1, 4) are operated based on output signals from these four pixels. Meanwhile, color differential signal CR is calculated based on output signals from pixels in two rows and two columns shifted by one pixel in the y-direction.

Now, the method of calculating luminance signal CL and color differential signals CR and CB described in conjunction with FIGS. 10 to 13 may be generalized as follows:

i) if x=2n−2, y=4n−4 (n: natural number)

$$CL(x, y) = D(x, y) + D(x+1, y) + D(x, y+1) + D(x+1, y+1)$$
$$= Mg(x, y) + G(x+1, y) + Ye(x, y+1) + Cy(x+1, y+1)$$
$$CR(x, y) = D(x+1, y+2) + D(x, y+1) - D(x, y+2) - D(x+1, y+1)$$
$$= Mg(x+1, y+2) + Ye(x, y+1) - G(x, y+2) - Cy(x+1, y+1)$$
$$CB(x, y) = D(x, y) + D(x+1, y+1) - D(x, y+1) - D(x+1, y)$$
$$= Mg(x, y) + Cy(x+1, y+1) - Ye(x, y+1) - G(x+1, y)$$

ii) if x=2n−2, y=4n−3 (n: natural number)

$$CL(x, y) = D(x+1, y+1) + D(x, y+1) + D(x, y) + D(x+1, y)$$
$$= Mg(x+1, y+1) + G(x, y+1) + Ye(x, y) + Cy(x+1, y)$$
$$CR(x, y) = D(x+1, y+1) + D(x, y) - D(x, y+1) - D(x+1, y)$$
$$= Mg(x+1, y+1) + Ye(x, y) - G(x, y+1) - Cy(x+1, y)$$
$$CB(x, y) = D(x, y-1) + D(x+1, y) - D(x, y) - D(x+1, y-1)$$
$$= Mg(x, y-1) + Cy(x+1, y) - Ye(x, y) - G(x+1, y-1)$$

iii) if x=2n−2, y=4n−2 (n: natural number)

$$CL(x, y) = D(x+1, y) + D(x, y) + D(x, y+1) + D(x+1, y+1)$$
$$= Mg(x+1, y) + G(x, y) + Ye(x, y+1) + Cy(x+1, y+1)$$
$$CR(x, y) = D(x+1, y) + D(x, y+1) - D(x, y) - D(x+1, y+1)$$
$$= Mg(x+1, y) + Ye(x, y+1) - G(x, y) - Cy(x+1, y+1)$$
$$CB(x, y) = D(x, y+2) + D(x+1, y+1) - D(x, y+1) - D(x+1, y+2)$$
$$= Mg(x, y+2) + Cy(x+1, y+1) - Ye(x, y+1) - G(x+1, y+2)$$

iv) if x=2n−2, y=4n−1 (n: natural number)

$$CL(x, y) = D(x, y+1) + D(x+1, y+1) + D(x, y) + D(x+1, y)$$
$$= Mg(x, y+1) + G(x+1, y+1) + Ye(x, y) + Cy(x+1, y)$$
$$CR(x, y) = D(x+1, y-1) + D(x, y) - D(x, y-1) - D(x+1, y)$$
$$= Mg(x+1, y-1) + Ye(x, y) - G(x, y-1) - Cy(x+1, y)$$
$$CB(x, y) = D(x, y+1) + D(x+1, y) - D(x, y) - D(x+1, y+1)$$
$$= Mg(x, y+1) + Cy(x+1, y) - Ye(x, y) - G(x+1, y+1)$$

v) if x=2n−1, y=4n−4 (n: natural number)

$$CL(x, y) = D(x+1, y) + D(x, y) + D(x+1, y+1) + D(x, y+1)$$
$$= Mg(x+1, y) + G(x, y) + Ye(x+1, y+1) + Cy(x, y+1)$$
$$CR(x, y) = D(x, y+2) + D(x+1, y+1) - D(x+1, y+2) - D(x, y+1)$$
$$= Mg(x, y+2) + Ye(x+1, y+1) - G(x+1, y+2) - Cy(x, y+1)$$
$$CB(x, y) = D(x+1, y) + D(x, y+1) - D(x+1, y+1) - D(x, y)$$
$$= Mg(x+1, y) + Cy(x, y+1) - Ye(x+1, y+1) - G(x, y)$$

vi) if x=2n−1, y=4n−3 (n: natural number)

$$CL(x, y) = D(x, y+1) + D(x+1, y+1) + D(x+1, y) + D(x, y)$$
$$= Mg(x, y+1) + G(x+1, y+1) + Ye(x+1, y) + Cy(x, y)$$
$$CR(x, y) = D(x, y+1) + D(x+1, y) - D(x+1, y+1) - D(x, y)$$
$$= Mg(x, y+1) + Ye(x+1, y) - G(x+1, y+1) - Cy(x, y)$$
$$CB(x, y) = D(x+1, y-1) + D(x, y) - D(x+1, y) - D(x, y-1)$$
$$= Mg(x+1, y-1) + Cy(x, y) - Ye(x+1, y) - G(x, y-1)$$

vii) if x=2n−1, y=4n−2 (n: natural number)

$$CL(x, y) = D(x, y) + D(x+1, y) + D(x+1, y+1) + D(x, y+1)$$
$$= Mg(x, y) + G(x+1, y) + Ye(x+1, y+1) + Cy(x, y+1)$$
$$CR(x, y) = D(x, y) + D(x+1, y+1) - D(x+1, y) - D(x, y+1)$$
$$= Mg(x, y) + Ye(x+1, y+1) - G(x+1, y) - Cy(x, y+1)$$
$$CB(x, y) = D(x+1, y+2) + D(x, y+1) - D(x+1, y+1) -$$
$$D(x, y+2)$$
$$= Mg(x+1, y+2) + Cy(x, y+1) - Ye(x+1, y+1) -$$
$$G(x, y+2)$$

viii) if x=2n−1, y=4n−1 (n: natural number)

$$CL(x, y) = D(x+1, y+1) + D(x, y+1) + D(x+1, y) + D(x, y)$$
$$= Mg(x+1, y+1) + G(x, y+1) + Ye(x+1, y) + Cy(x, y)$$
$$CR(x, y) = D(x, y-1) + D(x+1, y) - D(x+1, y-1) - D(x, y)$$
$$= Mg(x, y-1) + Ye(x+1, y) - G(x+1, y-1) - Cy(x, y)$$
$$CB(x, y) = D(x+1, y+1) + D(x, y) - D(x+1, y) - D(x, y+1)$$
$$= Mg(x+1, y+1) + Cy(x, y) - Ye(x+1, y) - G(x, y+1)$$

Effect of Suppressing Ghost Color Signal

By the operation of CLCRCB generation circuit 104 as described above, the effect of suppressing generation of ghost color signals by luminance signal CL and color differential signals CR and CB may be confirmed as follows.

As an example, color differential signals for pixel (0, 0) will be derived.

Pixel (0, 0) corresponds to the case where x=2n−2, y=4n−4, and n=1.

A calculation for the case in which there exists a luminance change H1 in the horizontal direction shown in FIG. 8 will be as follows:

$$CR(0, 0) = D(1, 2) + D(0, 1) - D(0, 2) - D(1, 1) \quad (26)$$
$$= b \times Mg + a \times Ye - a \times G - b \times Cy$$
$$= a \times (R + G - G) + b \times (R + B - B - G)$$
$$= -S(b - a)$$

wherein 2R−G=0, 2B−G=0 are established, because there is no color component for a neutral color.

Similarly, color differential signal CB(0, 0) will be calculated as follows.

$$CB(0, 0) = S(b-a) \quad (27)$$

If there exists a luminance level change H2 in the horizontal direction as shown in FIG. 8, the color differential signal for pixel (1, 0) may be similarly calculated as follows:

$$CB(1, 0) = S(b-a) \quad (28)$$
$$CR(1, 0) = -S(b-a) \quad (29)$$

This also applies to pixels at edge portions in other luminance signals.

Furthermore, if there is a luminance signal level change in the vertical direction as shown in FIG. 8, a similar operation shows that any of color differential signals CR and CB reaches 0 so that no ghost color signal is generated.

Color differential signals corresponding to a single pixel are calculated for each two rows in the vertical direction, its vertical resolution is V/2 if there is V pixels in the vertical direction. However, since human eyes are sensitive to changes in luminance (brightness), but less sensitive to change in color, such deterioration in the resolution will cause almost no deterioration in picture quality.

Therefore, use of the above-described signal processing provides a high resolution image with almost no ghost color.

Thus, luminance signal CL and color differential signals CR and CB can be generated for each of all the pixels constituting CCD 10.

Since the straightforward relation as described above is established between pixel (x, y) to which the CCD output signal corresponds and the color of the color filter, CLCRCB generation circuit 104 can generate luminance signal CL and color differential signals CR and CB through the above-described operation based on the relation.

Separation of RGB Signal

The operation of matrix circuit 108 shown in FIG. 7 is the same as the first embodiment.

Matrix circuit 108 therefore performs operations represented by expressions (24) to (26) to signals CL, CR and CB received from CLCRCB generation circuit 304 to separate a RGB signal corresponding to each of all of the pixels in the CCD.

An RGB signal corresponding to each of all the pixels in CCD 10 can be generated. As is the case with the first embodiment, an improved resolution, H−1 in the horizontal direction and V−1 in the vertical direction can be implemented as opposed to a conventional color separation circuit.

Furthermore, ghost colors may be advantageously suppressed as described above.

Fourth Embodiment

A color separation circuit 400 according to a fourth embodiment of the invention has essentially the same structure as color separation circuit 200 according to the second embodiment. However, the fourth embodiment is directed to suppressing generation of a ghost color signal by replacing color signal separation circuit 210 with a color differential signal separation circuit 410 as will be described later.

Figure 14:
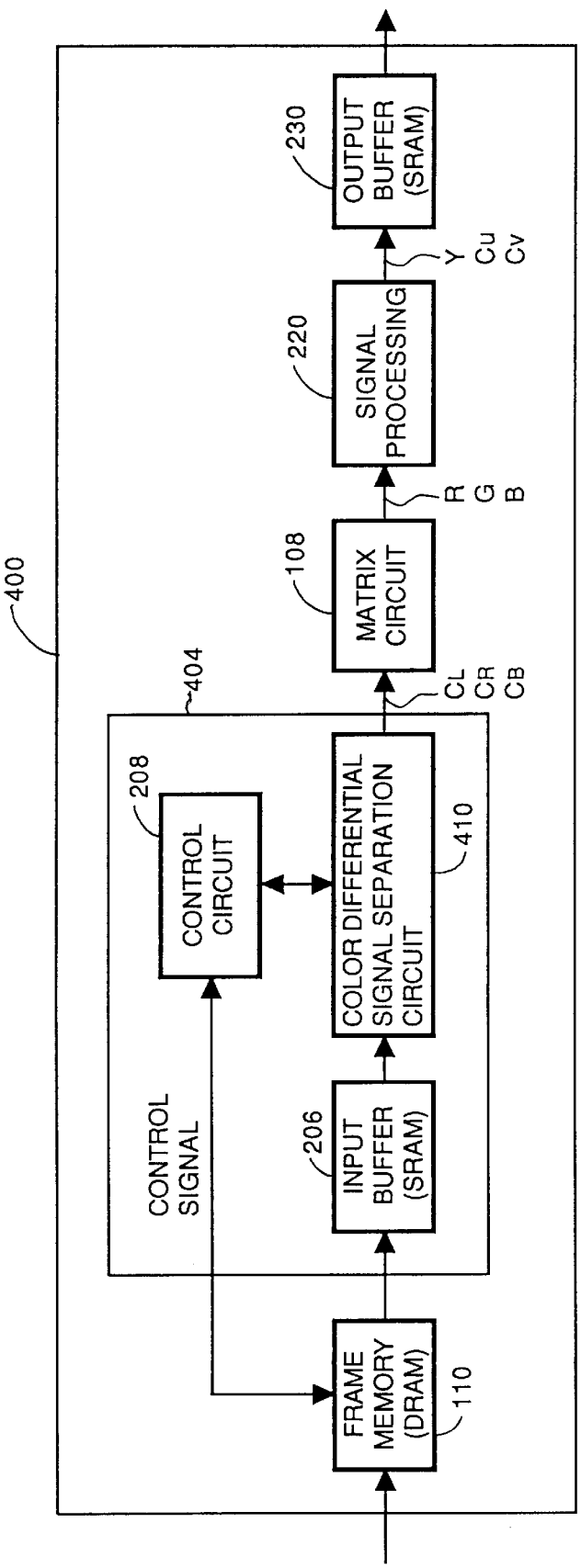
FIG. 14 is a block diagram schematically showing the structure of a main portion of a color separation circuit 400 according to a fourth embodiment of the invention.

More specifically, the structure of color separation circuit 300 according to the fourth embodiment shown in FIG. 14 is essentially identical to the structure of color separation circuit 200 shown in FIG. 5 with a difference being that color differential signal separation circuit 210 is replaced with a color differential signal separation circuit 410.

Meanwhile, color separation circuit 400 includes a frame memory 110 for storing the entire one frame of signal D(x, y) from CCD 10, and a CLCRCB generation circuit 404 generates luminance signal CL, and first and second color differential signals CR and CB in response to data from the frame memory, as opposed to color separation circuit 300 according to the third embodiment. Since the other features are the same as those of color separation circuit 300 according to the third embodiment, the same portions are denoted by the same reference numerals and characters and a description will not be repeated here.

More specifically, also in color separation circuit 400 according to the fourth embodiment, luminance signal CL and first and second color differential signals CR and CB are generated according to the method described in conjunction with FIGS. 10 to 13 according to the third embodiment.

Figure 15:
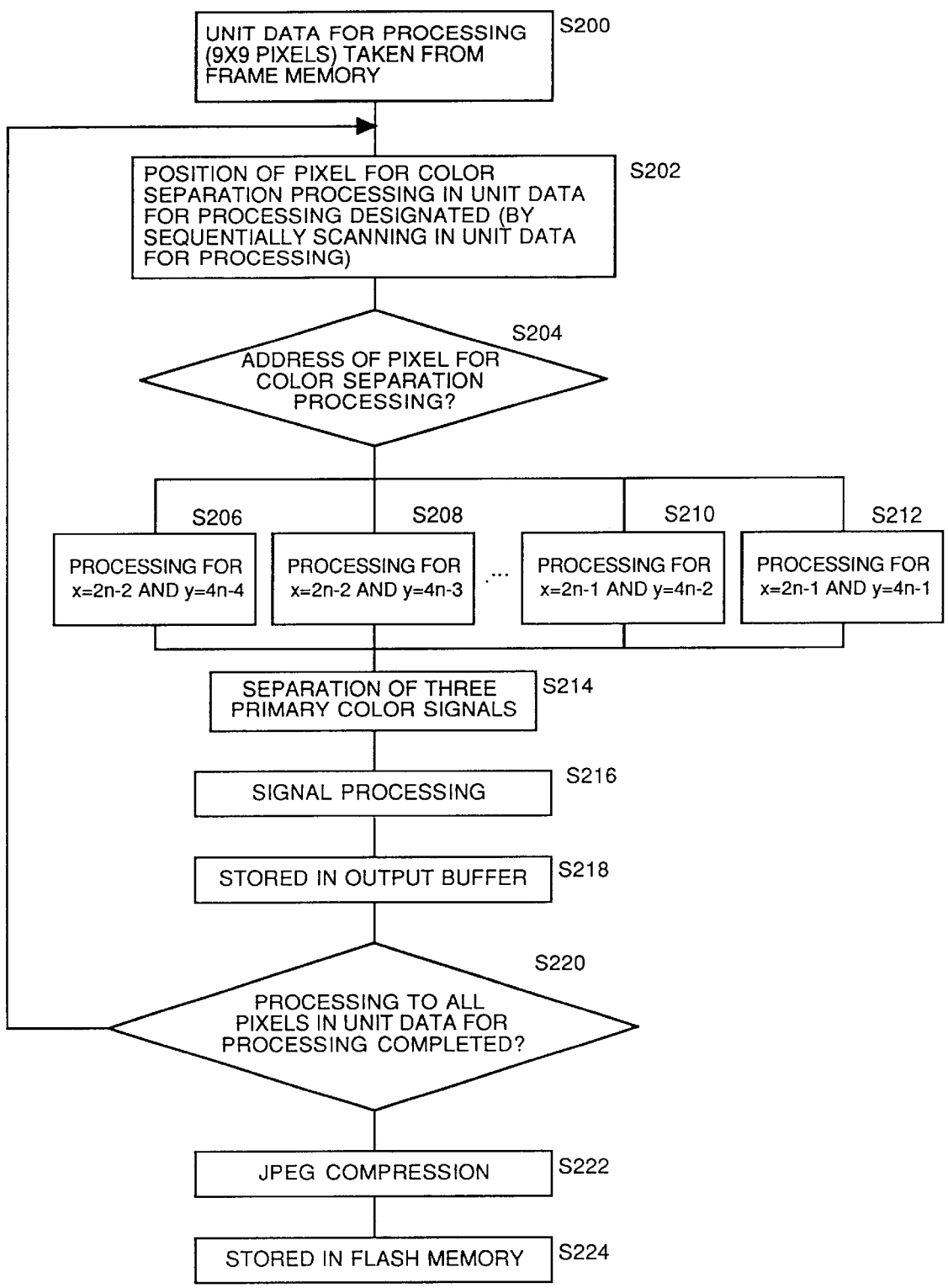
FIG. 15 is a flow chart for use in illustration of the operation of color separation circuit 400 according to the fourth embodiment.
Figure 16:
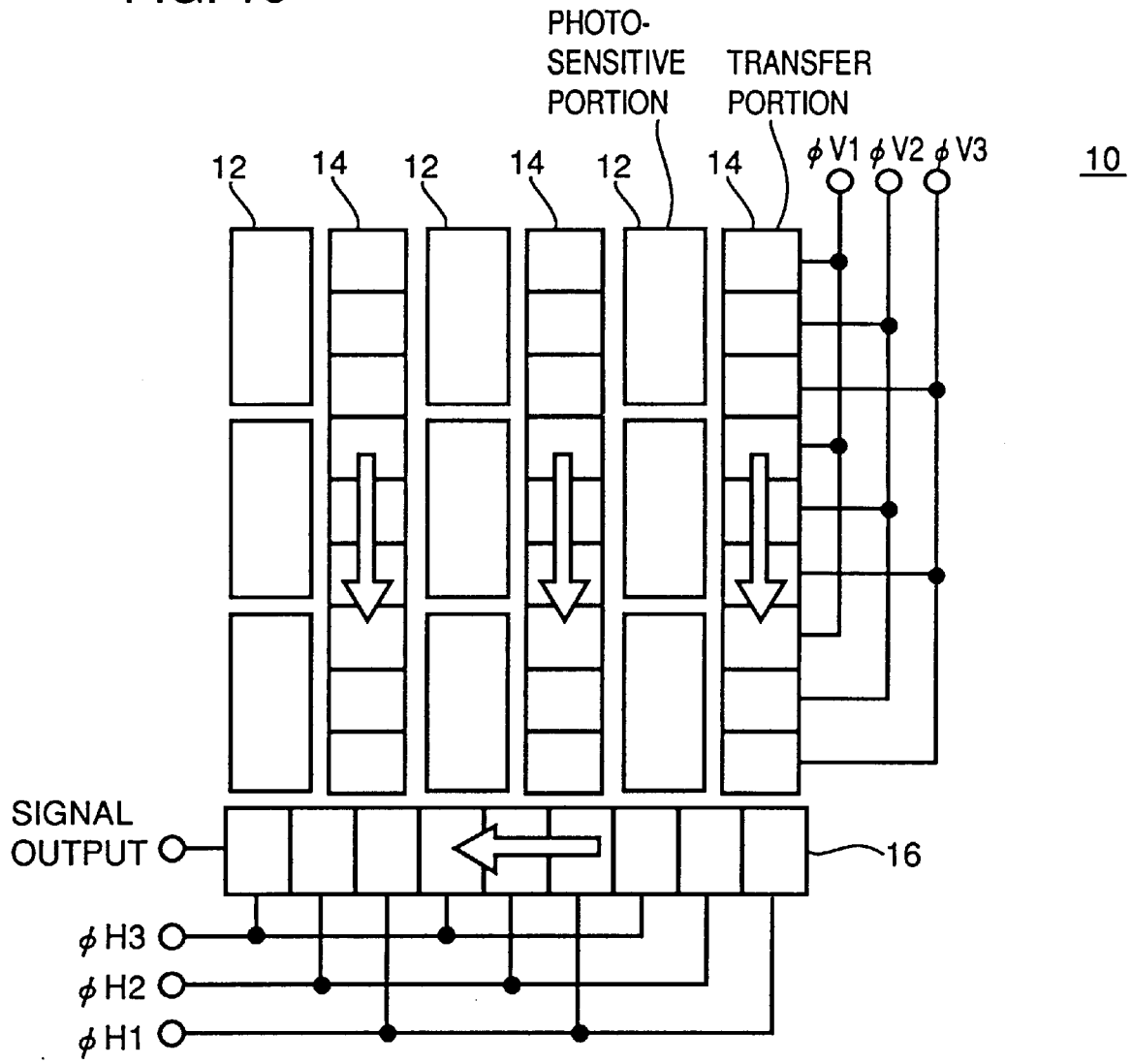
FIG. 16 is a diagram schematically showing the structure of an inter-line transfer CCD.

FIG. 15 is a flow chart for use in illustration of the operation of color separation circuit 400 shown in FIG. 14.

Referring to FIG. 15, input buffer 206 is controlled by control circuit 208 to take in a unit data block for processing (data for 9×11 pixels) from frame memory 110 (step S200).

Color differential signal separation circuit 410 then receives data for 4×2 pixels for a separation processing of color differential signals from the unit data in input buffer 206 in response to addresses designated by control circuit 208 (step S202).

Color differential signal separation circuit 410 performs the processing described in conjunction with FIGS. 10 to 13 depending upon the color of a color filter corresponding to each pixel which is defined based on the addresses of 4×2 pixels. More specifically, in the arrangement of color filters shown in FIG. 8, a processing corresponding to the values of x and y of a pixel (x, y) corresponding to the position to produce color differential signals among the 4×2 pixels is performed (steps S206 to S212).

Matrix circuit 108 receives an output from color differential signal separation circuit 210 and outputs three primary color signals R, G and B corresponding to the central position in each of 2×2 pixels (step S214).

Signal processing circuit 220 then generates Y, Cu and Cv signals, video signals based on the three primary color signals (step S216).

Output buffer 230 accumulates video signals output from signal processing circuit 220 (step S218).

Then, it is determined whether or not a color differential signal separation processing has been completed to one block of data (data for 9×11 pixels) stored in input buffer 206 (step S220).

If it is determined that the processing to the one block of data has not been completed, the processing returns to S202 (step S220).

If it is determined that the processing to the one block of data has been completed (step S220), Y, Cu and Cv data corresponding to 8×8 pixels is output from output buffer 230, and the JPEG coding circuit performs a JPEG coding processing (image data compressing processing) to the data (step S222).

The coded data is accumulated in the flash memory (step S224).

The above-described processing is repeatedly performed to one frame of data stored in frame memory 110, and one frame of image data is compressed and stored.

Therefore, an RGB signal corresponding to each of all the pixels in CCD 10 can be generated. Therefore, as is the third embodiment, an improved resolution, H−1 in the horizontal direction and V−1 in the vertical direction may be implemented as opposed to a conventional color separation circuit.

In addition, ghost colors may be advantageously suppressed as is the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of separating a color signal in a color camera including a single solid state imaging device having an array of color differentially ordered color filters and a corresponding array of photoelectric conversion elements, comprising the steps, responsive to output signals each transmitted from a corresponding pixel(x,y) in a y-th row and an x-th column of said array of photoelectric conversion elements, of:

producing a luminance signal CL(x,y) corresponding to said pixel(x,y) by a prescribed linear operation on said output signals from a set of pixels in two rows and two columns including said pixel(x,y);

producing a first color differential signal CR(x,y) corresponding to said pixel(x,y) by a first linear operation on said output signals from said set of pixels depending on an arrangement of said color filter array corresponding to said set of pixels; and producing a second color differential signal CB(x,y) corresponding to said pixel(x,y) by a second linear operation on said output signals from said set of pixels depending on the arrangement of said color filter array corresponding to said set of pixels;

wherein:

the prescribed linear operation is represented by: CL(x,y)=D(x,y)+D(x+1,y)+D(x,y+1)+D(x+1,y+1);

a first coefficient KR(X,Y)=1 (with X=x or x+1, Y=y or y+1) if color filters corresponding to a pixel(X,Y) are yellow or magenta filters and KR(X,Y)=−1 if the color filters are cyan or green filters, and the first linear operation is given by:

$$CR(x, y) = KR(x, y) \cdot D(x, y) + KR(x + 1, y) \cdot D(x + 1, y) +$$
$$KR(x, y + 1) \cdot D(x, y + 1) +$$
$$KR(x + 1, y + 1) \cdot D(x + 1, y + 1);$$

and a second coefficient KB(X,Y)=1 if the color filters corresponding to the pixel(X,Y) are cyan or magenta filters and that KB(X,Y)=−1 if the color filters are yellow or green filters, and the second linear operation is given by:

$$CB(x, y) = KB(x, y) \cdot D(x, y) + KB(x + 1, y) \cdot D(x + 1, y) +$$
$$KB(x, y + 1) \cdot D(x, y + 1) +$$
$$KB(x + 1, y + 1) \cdot D(x + 1, y + 1).$$

2. A method of separating a color signal in a color camera including a single solid state imaging device having an array of color filters and a corresponding array of photoelectric conversion elements, said array of filters including filters for green and three complementary colors collectively corresponding to a set of four pixels and arbitrarily arranged in two rows and two columns, the method comprising the steps, based on output signals each transmitted from a corresponding pixel(x,y) in the y-th row and x-th column of said array of photoelectric conversion elements, of:

producing a first color differential signal CR(x,y) corresponding to said pixel(x,y) in accordance with:

$$CR(x, y) = KR(x, y) \cdot D(x, y) + KR(x + 1, y) \cdot D(x + 1, y) +$$
$$KR(x, y + 1) \cdot D(x, y + 1) + KR(x + 1, y + 1) \cdot$$
$$D(x + 1, y + 1)$$

where: first coefficient KR(X,Y)=1 (with X=x or x+1, Y=y or y+1) if a color filter corresponding to the pixel(X,Y) is a yellow filter or a magenta filter and KR(X,Y)=−1 if said color filter is a cyan filter or a green filter; and producing a second color differential signal CB(x,y) corresponding to said pixel(x,y) in accordance with:

$$CB(x, y) = KB(x, y) \cdot D(x, y) + KB(x + 1, y) \cdot D(x + 1, y) +$$
$$KB(x, y + 1) \cdot D(x, y + 1) + KB(x + 1, y + 1) \cdot$$
$$D(x + 1, y + 1)$$

where: second coefficient KB(X,Y)=1 if the color filter corresponding to the pixel(X,Y) is a cyan filter or a magenta filter and KB(X,Y)=−1 if the color filter is a yellow filter or a green filter.

3. A color camera comprising:
(A) a single solid state imaging device having photoelectric conversion elements, each of the elements corresponding to a pixel in an array, and said solid state imaging device including a color filter array in which color filters respectively correspond to said photoelectric conversion elements and are located on a side of a light receiving surface of the device;
(B) wherein said color filter array includes filters for green and three complimentary colors collectively corresponding to a set of four pixels in an image and arbitrarily arranged in two rows and two columns; and
(C) a color separator, which receives output signals independently read out from all pixels in the image by said solid state imaging device, for generating a corresponding one primary color signal for each set of said four pixels, said color separator having:
　(C1) a storing unit which sequentially stores said output signals from said solid state imaging device; and
　(C2) an operating unit for generating, for each set of said four pixels, a luminance signal and first and second color differential signals, each of the color differential signals corresponding to a difference in intensity between a green signal and a prescribed one of two other primary color signals in a plurality of primary color signals, and generating said corresponding one primary color signal from said luminance signal and said color differential signals, wherein said output signal from the solid state imaging device which corresponds to a pixel (x,y) in a y-th row and an x-th column is defined as D(x,y) and said set of four pixels includes pixels p(x,y), p(x+1,y), p(x,y+1) and p(x+1,y+1), wherein said operating unit comprises:
　　(C2a) a color differential signal generator for generating said luminance signal and said first and second color differential signals by a linear combination of output signals D(x,y), D(x+1,y), D(x,y+1) and D(x+1,y+1) from said set of four pixels depending on an arrangement of the color filters of the color filter array corresponding to said set of four pixels; and
　　(C2b) a separating operation unit for separating said corresponding one primary color signal from said luminance signal and said first and second color differential signals; and
(D) wherein:
　(D1) said color filter array comprises:
　　(D1a) a plurality of first rows having alternatively arranged magenta filters and green filters; and
　　(D1b) a plurality of second rows having alternately arranged yellow filters and cyan filters; and
　　(D1c) for a natural number n:
　　　(D1c)(i) if said second rows belong to rows either represented as y=4n−4 or y=4n−2, each of said second rows includes a yellow filter at every position, x, corresponding to an even number;
　　　(D1c)(ii) if said first rows belong to rows represented as y=4n−3, each of said first rows includes a green filter at every position where x corresponds to an odd number; and
　　　(D1c)(iii) if said first rows belong to rows represented as y=4n−1, each of said first rows includes a green filter at every position where x corresponds to an even number; and
　(D2) said color differential signal generator generates:
　　(D2a) said first luminance signal CL(x,y) corresponding to said pixel(x,y) in the y-th row and the x-th column as $$CL(x,y)=D(x,y)+D(x+1,y)+D(x,y+1)+D(x+1,y+1);$$

(D2b) said first color differential signal CR(x,y) corresponding to the pixel(x,y) is given by $$CR(x,y)=KR(x,y)\cdot D(x,y)+KR(x+1,y)\cdot D(x+1,y)+KR(x,y+1)\cdot D(x,y+1)+KR(x+1,y+1)\cdot D(x+1,y+1)$$

where: first coefficient KR(X,Y)=1 (with X=x or x+1, Y=y or y+1) if a color filter corresponding to the pixel(X,Y) is a yellow filter or a magenta filter, and KR(X,Y)=−1 if said color filter corresponding to the pixel(X,Y) is a cyan filter or a green filter; and
　　(D2c) said second color differential signal CB(x,y) corresponding to the pixel(x,y) is given by $$CB(x,y)=KB(x,y)\cdot D(x,y)+KB(x+1,y)\cdot D(x+1,y)+KB(x,y+1)\cdot D(x,y+1)+KB(x+1,y+1)\cdot D(x+1,y+1)$$

where: second coefficient KB(X,Y)=1 if the color filter corresponding to the pixel(X,Y) is a cyan filter or a magenta filter, and KB(X,Y)=−1 if the color filter corresponding to the pixel(X,Y) is a yellow filter or a green filter.

4. A color camera comprising:
(A) a single solid state imaging device having photoelectric conversion elements, each of the elements corresponding to a pixel in an array, and said solid state imaging device including a color filter array in which color filters respectively correspond to said photoelectric conversion elements and are located on a side of a light receiving surface of the device;
(B) wherein said color filter array includes filters for green and three complimentary colors collectively corresponding to a set of four pixels in an image and arbitrarily arranged in two rows and two columns; and
(C) a color separator, which receives output signals independently read out from all pixels in the image by said solid state imaging device, for generating a corresponding one primary color signal for each set of said four pixels, said color separator having:
　(C1) a storing unit which sequentially stores said output signals from said solid state imaging device; and
　(C2) an operating unit for generating, for each set of said four pixels, a luminance signal and first and second color differential signals, each of the color differential signals corresponding to a difference in intensity between a green signal and a prescribed one of two other primary color signals in a plurality of primary color signals, and generating said corresponding one primary color signal from said luminance signal and said color differential signals, wherein said output signal from the solid state imaging device which corresponds to a pixel (x,y) in a y-th row and an x-th column is defined as D(x,y) and said set of four pixels includes pixels p(x,y), p(x+1,y), p(x,y+1) and p(x+1,y+1), wherein said operating unit comprises:
　　(C2a) a color differential signal generator for generating said luminance signal and said first and second color differential signals by a linear combination of output signals D(x,y), D(x+1,y), D(x,y+1) and D(x+1,y+1) from said set of four pixels depending on an arrangement of the color filters of the color filter array corresponding to said set of four pixels; and
　　(C2b) a separating operation unit for separating said corresponding one primary color signal from said luminance signal and said first and second color differential signals; and (D) wherein:

(D1) said color filter array comprises:

(D1a) a plurality of first rows each including alternately arranged magenta filters and green filters; and (D1b) a plurality of second rows alternating with said first rows in a column direction and each including alternately arranged yellow filters and cyan filters; and (D1c) wherein said yellow filters are aligned at every other column; and (D2) said color differential signal generator generates:

(D2a) said first color differential signal CR(x,y) corresponding to the pixel(x,y) in accordance with:

$$CR(x, y) = KR(x, y) \cdot D(x, y) + KR(x+1, y) \cdot D(x+1, y) + KR(x, y+1) \cdot D(x, y+1) + KR(x+1, y+1) \cdot D(x+1, y+1)$$

where: first coefficient KR(X,Y)=1 (with X=x or x+1, Y=y or y+1) if a color filter corresponding to the pixel(X,Y) is a yellow filter or a magenta filter and KR(X,Y)=−1 if said color filter is a cyan filter or a green filter; and (D2b) said second color differential signal CB(x,y) corresponding to the pixel(x,y) in accordance with:

$$CB(x, y) = KB(x, y) \cdot D(x, y) + KB(x+1, y) \cdot D(x+1, y) + KB(x, y+1) \cdot D(x, y+1) + KB(x+1, y+1) \cdot D(x+1, y+1)$$

where: second coefficient KB(X,Y)=1 if the color filter corresponding to the pixel(X,Y) is a cyan filter or a magenta filter and KB(X,Y)=−1 if the color filter is a yellow filter or a green filter.

5. The color camera as recited in claim 4, wherein said color differential signal generator generates said luminance signal CL(x,y) corresponding to the pixel(x,y) in accordance with:

$$CL(x,y)=D(x,y)+D(x+1,y)+D(x,y+1)+D(x+1,y+1).$$

* * * * *